United States Patent
Nordin et al.

(10) Patent No.: US 7,455,527 B2
(45) Date of Patent: Nov. 25, 2008

(54) POWERED PATCH PANEL

(75) Inventors: Ronald A Nordin, Naperville, IL (US); Masud Bolouri-Saransar, Orland Park, IL (US); Michael V. Doorhy, Mokena, IL (US)

(73) Assignee: Panduit Corp., Tinley Park, IL (US)

( * ) Notice: Subject to any disclaimer, the term of this patent is extended or adjusted under 35 U.S.C. 154(b) by 651 days.

(21) Appl. No.: 11/119,009

(22) Filed: Apr. 29, 2005

(65) Prior Publication Data

US 2005/0245127 A1    Nov. 3, 2005

Related U.S. Application Data

(60) Provisional application No. 60/567,765, filed on May 3, 2004.

(51) Int. Cl.
*H01R 29/00*    (2006.01)

(52) U.S. Cl. .................................................... 439/49

(58) Field of Classification Search ............... 439/49, 439/676, 540.1
See application file for complete search history.

(56) References Cited

U.S. PATENT DOCUMENTS

| | | | |
|---|---|---|---|
| 3,661,187 A | 5/1972 | Caveney et al. |
| 3,771,098 A | 11/1973 | Dempsey |
| 4,479,228 A | 10/1984 | Crane |
| 4,733,389 A | 3/1988 | Puvogel |
| 4,767,181 A | 8/1988 | McEowen |
| 4,937,825 A | 6/1990 | Ballard et al. |
| 5,065,798 A | 11/1991 | Alletto et al. |
| 5,081,627 A | 1/1992 | Yu |
| 5,089,927 A | 2/1992 | Bulan et al. |
| 5,161,988 A | 11/1992 | Krupka |
| 5,170,272 A | 12/1992 | Onno |
| 5,222,164 A | 6/1993 | Bass, Sr. et al. |
| 5,226,120 A | 7/1993 | Brown et al. |
| 5,233,501 A | 8/1993 | Allen et al. |
| 5,270,658 A | 12/1993 | Epstein |
| 5,282,270 A | 1/1994 | Oppenheimer et al. |
| 5,293,635 A | 3/1994 | Faulk, Jr. et al. |

(Continued)

FOREIGN PATENT DOCUMENTS

EP    1 152 569 A3    7/2003

(Continued)

OTHER PUBLICATIONS

U.S. Appl. No. 10/910,899, filed Aug. 3, 2004, Caveney et al.

(Continued)

*Primary Examiner*—Neil Abrams
*Assistant Examiner*—Phuong Nguyen
(74) *Attorney, Agent, or Firm*—Robert A. McCann; Zachary J. Smolinski

(57) ABSTRACT

A powered communications patch panel is adapted to power network devices connected to the communications patch panel. Power is supplied to the network devices by the powered communications patch panel over the communication cabling. The powered communications patch panel may be provided with a management port to allow remote management of the patch panel via a network connection. Multiple management ports may be provided, allowing patch panels to be connected to one another in a daisy-chain configuration.

15 Claims, 17 Drawing Sheets

U.S. PATENT DOCUMENTS

| | | |
|---|---|---|
| 5,394,503 A | 2/1995 | Dietz, Jr. et al. |
| 5,406,260 A | 4/1995 | Cummings et al. |
| 5,421,024 A | 5/1995 | Faulk, Jr. et al. |
| 5,437,046 A | 7/1995 | Bright et al. |
| 5,483,467 A | 1/1996 | Krupka et al. |
| 5,521,902 A | 5/1996 | Ferguson |
| 5,526,489 A | 6/1996 | Nilakantan et al. |
| 5,532,603 A | 7/1996 | Bottman |
| 5,559,955 A | 9/1996 | Dev et al. |
| 5,572,640 A | 11/1996 | Schettler |
| 5,577,105 A | 11/1996 | Baum et al. |
| 5,583,874 A | 12/1996 | Smith et al. |
| 5,606,664 A | 2/1997 | Brown et al. |
| 5,613,873 A | 3/1997 | Bell, Jr. |
| 5,636,138 A | 6/1997 | Gilbert et al. |
| 5,649,001 A | 7/1997 | Thomas et al. |
| 5,675,813 A | 10/1997 | Holmdahl |
| 5,684,796 A | 11/1997 | Abidi et al. |
| 5,684,959 A | 11/1997 | Bhat et al. |
| 5,706,440 A | 1/1998 | Compliment et al. |
| 5,726,972 A | 3/1998 | Ferguson |
| 5,736,910 A | 4/1998 | Townsend et al. |
| 5,742,672 A | 4/1998 | Burk |
| 5,745,682 A | 4/1998 | Keenan |
| 5,761,281 A | 6/1998 | Baum et al. |
| 5,764,043 A | 6/1998 | Czosnowski et al. |
| 5,790,041 A | 8/1998 | Lee |
| 5,793,975 A | 8/1998 | Zeldin |
| 5,797,767 A | 8/1998 | Schell |
| 5,832,964 A | 11/1998 | Joshi |
| 5,841,842 A | 11/1998 | Baum et al. |
| 5,847,557 A | 12/1998 | Fincher et al. |
| 5,854,824 A | 12/1998 | Bengal et al. |
| 5,870,626 A | 2/1999 | Lebeau |
| 5,878,030 A | 3/1999 | Norris |
| 5,892,756 A | 4/1999 | Murphy |
| 5,898,837 A | 4/1999 | Guttman et al. |
| 5,909,429 A | 6/1999 | Satyanarayana et al. |
| 5,915,425 A | 6/1999 | Nilsson et al. |
| 5,923,663 A | 7/1999 | Bontemps et al. |
| 5,960,416 A | 9/1999 | Block |
| 5,991,885 A | 11/1999 | Chang et al. |
| 5,994,998 A | 11/1999 | Fisher et al. |
| 6,002,331 A | 12/1999 | Laor |
| 6,014,667 A | 1/2000 | Jenkins et al. |
| 6,041,352 A | 3/2000 | Burdick et al. |
| 6,055,236 A | 4/2000 | Nessett et al. |
| 6,058,412 A | 5/2000 | Kojima et al. |
| 6,094,261 A | 7/2000 | Contarino, Jr. |
| 6,115,468 A | 9/2000 | De Nicolo |
| 6,131,119 A | 10/2000 | Fukui |
| 6,140,911 A | 10/2000 | Fisher et al. |
| 6,152,762 A | 11/2000 | Marshall et al. |
| 6,157,925 A | 12/2000 | Jenkins et al. |
| 6,175,865 B1 | 1/2001 | Dove et al. |
| 6,178,438 B1 | 1/2001 | Tschirhart et al. |
| 6,205,122 B1 | 3/2001 | Sharon et al. |
| 6,211,796 B1 | 4/2001 | Toms et al. |
| 6,212,206 B1 | 4/2001 | Ketcham |
| 6,218,930 B1 | 4/2001 | Katzenberg et al. |
| 6,222,908 B1 | 4/2001 | Bartolutti et al. |
| 6,222,910 B1 | 4/2001 | Price et al. |
| 6,224,417 B1 | 5/2001 | Belopolsky et al. |
| 6,229,538 B1 | 5/2001 | McIntyre et al. |
| 6,234,830 B1 | 5/2001 | Ensz et al. |
| 6,272,541 B1 | 8/2001 | Cromer et al. |
| 6,283,775 B1 | 9/2001 | Shupe et al. |
| 6,285,293 B1 | 9/2001 | German et al. |
| 6,289,370 B1 | 9/2001 | Panarello et al. |
| 6,295,356 B1 | 9/2001 | De Nicolo |
| 6,317,597 B1 | 11/2001 | Baker et al. |
| 6,327,623 B2 | 12/2001 | Watts |
| 6,329,906 B1 | 12/2001 | Fisher et al. |
| 6,330,307 B1 | 12/2001 | Bloch et al. |
| 6,348,874 B1 | 2/2002 | Cole et al. |
| 6,350,148 B1 | 2/2002 | Bartolutti et al. |
| 6,363,423 B1 | 3/2002 | Chiles et al. |
| 6,367,018 B1 | 4/2002 | Jain |
| 6,368,159 B1 | 4/2002 | Hess et al. |
| 6,381,283 B1 | 4/2002 | Bhardwaj et al. |
| 6,393,474 B1 | 5/2002 | Eichert et al. |
| 6,397,249 B1 | 5/2002 | Cromer et al. |
| 6,405,236 B1 | 6/2002 | Nieratschker |
| 6,421,322 B1 | 7/2002 | Koziy et al. |
| 6,421,376 B1 | 7/2002 | Williams et al. |
| 6,424,710 B1 | 7/2002 | Bartolutti et al. |
| 6,428,330 B1 | 8/2002 | Poulter et al. |
| 6,430,286 B1 | 8/2002 | Bhusri |
| 6,431,892 B1 | 8/2002 | Shupe et al. |
| 6,434,716 B1 | 8/2002 | Johnson et al. |
| 6,438,429 B1 | 8/2002 | Ho et al. |
| 6,438,695 B1 | 8/2002 | Maufer |
| 6,442,161 B1 | 8/2002 | Drummond-Murray et al. |
| 6,446,127 B1 | 9/2002 | Schuster et al. |
| 6,448,899 B1 | 9/2002 | Thompson |
| 6,449,348 B1 | 9/2002 | Lamb et al. |
| 6,453,014 B1 | 9/2002 | Jacobson et al. |
| 6,456,768 B1 | 9/2002 | Boncek et al. |
| 6,457,992 B2 | 10/2002 | Posey et al. |
| 6,457,993 B1 | 10/2002 | Espenshade |
| 6,473,608 B1 | 10/2002 | Lehr et al. |
| 6,483,712 B1 | 11/2002 | Oliphant et al. |
| 6,496,105 B2 | 12/2002 | Fisher et al. |
| 6,496,859 B2 | 12/2002 | Roy et al. |
| 6,499,861 B1 | 12/2002 | German et al. |
| 6,522,737 B1 | 2/2003 | Bartolutti et al. |
| 6,523,070 B1 | 2/2003 | Stapleton et al. |
| 6,535,983 B1 | 3/2003 | McCormack et al. |
| 6,541,878 B1 | 4/2003 | Diab |
| 6,546,494 B1 | 4/2003 | Jackson et al. |
| 6,563,824 B1 | 5/2003 | Bhatia et al. |
| 6,570,974 B1 | 5/2003 | Gerszberg et al. |
| 6,571,181 B1 | 5/2003 | Rakshani et al. |
| 6,574,481 B1 | 6/2003 | Rathnasabapathy et al. |
| 6,574,586 B1 | 6/2003 | David et al. |
| 6,577,622 B1 | 6/2003 | Schuster et al. |
| 6,580,697 B1 | 6/2003 | Gardner et al. |
| 6,580,785 B2 | 6/2003 | Bremer et al. |
| 6,587,454 B1 | 7/2003 | Lamb |
| 6,594,231 B1 | 7/2003 | Byham et al. |
| 6,594,707 B1 | 7/2003 | Rubinstein et al. |
| 6,601,097 B1 | 7/2003 | Cheston et al. |
| 6,603,220 B2 | 8/2003 | Vergnaud |
| 6,603,741 B1 | 8/2003 | Poulter et al. |
| 6,611,580 B1 | 8/2003 | Dahan et al. |
| 6,614,781 B1 | 9/2003 | Elliott et al. |
| 6,614,785 B1 | 9/2003 | Huai et al. |
| 6,628,623 B1 | 9/2003 | Noy |
| 6,629,269 B1 | 9/2003 | Kahkoska |
| 6,638,112 B1 | 10/2003 | Walker et al. |
| 6,640,308 B1 | 10/2003 | Keyghobad et al. |
| 6,643,566 B1 | 11/2003 | Lehr et al. |
| 6,643,595 B2 | 11/2003 | Rakshani et al. |
| 6,646,656 B1 | 11/2003 | Walker et al. |
| 6,650,901 B1 | 11/2003 | Schuster et al. |
| 6,654,387 B1 | 11/2003 | Beser et al. |
| 6,657,991 B1 | 12/2003 | Akgun et al. |
| 6,658,098 B2 | 12/2003 | Lamb et al. |
| 6,665,611 B1 | 12/2003 | Oran et al. |
| 6,674,745 B1 | 1/2004 | Schuster et al. |
| 6,675,308 B1 | 1/2004 | Thomsen |
| 6,678,250 B1 | 1/2004 | Grabelsky et al. |
| 6,678,357 B2 | 1/2004 | Stumer et al. |
| 6,678,728 B1 | 1/2004 | Uppunda et al. |

| | | |
|---|---|---|
| 6,681,252 B1 | 1/2004 | Schuster et al. |
| 6,684,179 B1 | 1/2004 | David |
| 6,688,910 B1 | 2/2004 | Macauley |
| 6,691,147 B1 | 2/2004 | Arunkumar et al. |
| 6,691,161 B1 | 2/2004 | Cook et al. |
| 6,691,256 B1 | 2/2004 | Cook et al. |
| 6,697,339 B1 | 2/2004 | Jain |
| 6,697,354 B1 | 2/2004 | Borella et al. |
| 6,697,862 B1 | 2/2004 | Beser et al. |
| 6,701,443 B1 | 3/2004 | Bell |
| 6,704,292 B1 | 3/2004 | Valentine et al. |
| 6,710,704 B2 | 3/2004 | Fisher et al. |
| 6,711,162 B1 | 3/2004 | Ortega et al. |
| 6,715,087 B1 | 3/2004 | Vergnaud et al. |
| 6,717,914 B1 | 4/2004 | Hamami |
| 6,718,030 B1 | 4/2004 | Turner et al. |
| 6,725,177 B2 | 4/2004 | David et al. |
| 6,751,230 B1 | 6/2004 | Vogel et al. |
| 6,753,761 B2 | 6/2004 | Fisher et al. |
| 6,754,310 B1 | 6/2004 | Steinbrenner et al. |
| 6,754,622 B1 | 6/2004 | Beser et al. |
| 6,763,001 B1 | 7/2004 | Jones et al. |
| 6,763,018 B1 | 7/2004 | Puthiyandyil et al. |
| 6,763,023 B1 | 7/2004 | Gleeson et al. |
| 6,764,343 B2 | 7/2004 | Ferentz |
| 6,778,911 B2 | 8/2004 | Opsal et al. |
| 6,810,416 B1 | 10/2004 | Dichter |
| 6,841,979 B2 | 1/2005 | Berson et al. |
| 6,916,206 B2 | 7/2005 | Ferentz |
| 6,992,491 B1 | 1/2006 | Lo et al. |
| 7,005,861 B1 | 2/2006 | Lo et al. |
| 7,014,500 B2 * | 3/2006 | Belesimo .................... 439/489 |
| 7,028,087 B2 | 4/2006 | Caveney |
| 7,068,043 B1 | 6/2006 | Lo et al. |
| 7,068,044 B1 | 6/2006 | Lo et al. |
| 7,160,143 B2 | 1/2007 | David et al. |
| 7,200,929 B2 * | 4/2007 | Coffey et al. .................. 29/857 |
| 7,207,846 B2 * | 4/2007 | Caveney et al. ............. 439/676 |
| 7,234,944 B2 | 6/2007 | Nordin et al. |
| 7,280,032 B2 * | 10/2007 | Aekins et al. .......... 340/310.11 |
| 2001/0029534 A1 | 10/2001 | Spinks et al. |
| 2001/0047407 A1 | 11/2001 | Moore et al. |
| 2001/0056500 A1 | 12/2001 | Farber et al. |
| 2002/0014514 A1 | 2/2002 | Saito et al. |
| 2002/0021209 A1 | 2/2002 | Fisher et al. |
| 2002/0032787 A1 | 3/2002 | Overton et al. |
| 2002/0049857 A1 | 4/2002 | Farber et al. |
| 2002/0055995 A1 | 5/2002 | Beckwith et al. |
| 2002/0059416 A1 | 5/2002 | Tuunanen |
| 2002/0062366 A1 | 5/2002 | Roy et al. |
| 2002/0069277 A1 | 6/2002 | Caveney |
| 2002/0083426 A1 | 6/2002 | Sistla |
| 2002/0085538 A1 | 7/2002 | Leung |
| 2002/0087678 A1 | 7/2002 | Padilla |
| 2002/0089960 A1 | 7/2002 | Shuster |
| 2002/0099787 A1 | 7/2002 | Bonner et al. |
| 2002/0101817 A1 | 8/2002 | Teixeira |
| 2002/0101818 A1 | 8/2002 | Teixeira |
| 2002/0120773 A1 | 8/2002 | Caveney |
| 2002/0129295 A1 | 9/2002 | Nishioka et al. |
| 2002/0131374 A1 | 9/2002 | Lee |
| 2002/0136360 A1 | 9/2002 | Stumer |
| 2002/0143991 A1 | 10/2002 | Chow et al. |
| 2002/0156916 A1 | 10/2002 | Watanabe |
| 2002/0161885 A1 | 10/2002 | Childers et al. |
| 2002/0171581 A1 | 11/2002 | Sheynblat et al. |
| 2002/0176386 A1 | 11/2002 | Singh |
| 2002/0182938 A1 | 12/2002 | Fuller |
| 2002/0187781 A1 | 12/2002 | Furlong |
| 2002/0188759 A1 | 12/2002 | Roy et al. |
| 2002/0188842 A1 | 12/2002 | Willeby |
| 2002/0191553 A1 | 12/2002 | Lehr et al. |
| 2002/0198991 A1 | 12/2002 | Gopalakrishnan et al. |
| 2003/0014548 A1 | 1/2003 | Valentine et al. |
| 2003/0018704 A1 | 1/2003 | Polychronids et al. |
| 2003/0036819 A1 | 2/2003 | Lehr et al. |
| 2003/0041238 A1 | 2/2003 | French et al. |
| 2003/0048878 A1 | 3/2003 | Drury et al. |
| 2003/0056153 A1 | 3/2003 | Beer et al. |
| 2003/0058085 A1 | 3/2003 | Fisher et al. |
| 2003/0061522 A1 | 3/2003 | Ke et al. |
| 2003/0062991 A1 | 4/2003 | Fisher et al. |
| 2003/0067881 A1 | 4/2003 | Lunt et al. |
| 2003/0087650 A1 | 5/2003 | Aarnio |
| 2003/0099076 A1 | 5/2003 | Elkayam et al. |
| 2003/0115260 A1 | 6/2003 | Edge |
| 2003/0140277 A1 | 7/2003 | Beer et al. |
| 2003/0146765 A1 | 8/2003 | Darshan et al. |
| 2003/0147412 A1 | 8/2003 | Weyman et al. |
| 2003/0154038 A1 | 8/2003 | Rakshani et al. |
| 2003/0154273 A1 | 8/2003 | Caveney |
| 2003/0154276 A1 | 8/2003 | Caveney |
| 2003/0154307 A1 | 8/2003 | Puthiyandyil et al. |
| 2003/0159066 A1 | 8/2003 | Staw et al. |
| 2003/0163581 A1 | 8/2003 | Moran et al. |
| 2003/0194912 A1 | 10/2003 | Ferentz |
| 2003/0202655 A1 | 10/2003 | Nattkemper et al. |
| 2003/0204356 A1 | 10/2003 | David et al. |
| 2004/0025066 A1 | 2/2004 | Jackson et al. |
| 2004/0037300 A1 | 2/2004 | Lehr et al. |
| 2004/0049321 A1 | 3/2004 | Lehr et al. |
| 2004/0049359 A1 | 3/2004 | Rakshani et al. |
| 2004/0057425 A1 | 3/2004 | Brouwer et al. |
| 2004/0064275 A1 | 4/2004 | Rakshani et al. |
| 2004/0073597 A1 | 4/2004 | Caveney et al. |
| 2004/0095933 A1 | 5/2004 | Lehr et al. |
| 2004/0148114 A1 | 7/2004 | Bell |
| 2004/0148532 A1 | 7/2004 | Bell |
| 2004/0160312 A1 | 8/2004 | Fisher et al. |
| 2004/0174251 A1 | 9/2004 | Fisher et al. |
| 2004/0201931 A1 | 10/2004 | Korcharz et al. |
| 2004/0260794 A1 | 12/2004 | Ferentz et al. |
| 2004/0266492 A1 | 12/2004 | Lehr et al. |
| 2005/0003795 A1 | 1/2005 | Lehr et al. |
| 2005/0041800 A1 | 2/2005 | Lehr et al. |
| 2005/0044431 A1 | 2/2005 | Lang et al. |
| 2005/0049758 A1 | 3/2005 | Lehr et al. |
| 2005/0078422 A1 | 4/2005 | Pincu et al. |
| 2005/0078700 A1 | 4/2005 | Thompson et al. |
| 2005/0080516 A1 | 4/2005 | Pincu et al. |
| 2005/0085212 A1 | 4/2005 | Peker et al. |
| 2005/0141431 A1 | 6/2005 | Caveney et al. |
| 2005/0159036 A1 * | 7/2005 | Caveney et al. ............. 439/188 |
| 2005/0221660 A1 * | 10/2005 | Coffey et al. ................ 439/404 |
| 2006/0047800 A1 | 3/2006 | Caveney et al. |
| 2006/0181398 A1 * | 8/2006 | Martich et al. ......... 340/310.11 |
| 2006/0181459 A1 * | 8/2006 | Aekins et al. ......... 343/700 MS |
| 2006/0282529 A1 * | 12/2006 | Nordin ...................... 709/224 |
| 2007/0032124 A1 | 2/2007 | Nordin |
| 2007/0117444 A1 | 5/2007 | Caveney et al. |
| 2007/0132503 A1 | 6/2007 | Nordin |
| 2007/0149045 A1 * | 6/2007 | Caveney et al. .......... 439/540.1 |
| 2007/0207666 A1 * | 9/2007 | Caveney et al. .......... 439/540.1 |

FOREIGN PATENT DOCUMENTS

| | | |
|---|---|---|
| EP | 1 422 884 A1 | 5/2004 |
| EP | 0 689 696 | 6/2004 |
| FR | 2 680 067 A1 | 2/2003 |
| GB | 2 236 398 A | 4/1991 |
| GB | 2347752 A | 9/2000 |
| WO | WO 98/03921 | 1/1998 |
| WO | 9926426 A1 | 5/1999 |
| WO | WO 00/60475 | 10/2000 |
| WO | 01055854 A1 | 8/2001 |
| WO | WO 01/65763 A2 | 9/2001 |

| WO | WO 02/10942 A1 | 2/2002 |
| WO | WO 02/47331 A2 | 6/2002 |
| WO | WO 02/076018 A2 | 9/2002 |

OTHER PUBLICATIONS

U.S. Appl. No. 10/969,863, filed Oct. 22, 2004, Caveney.
U.S. Appl. No. 10/997,600, filed Nov. 23, 2004, Caveney et al.
3COM User Guide—3COM Network Jack—Model NJ200; Sep. 2002.
Avaya Solving the Challenges of E911 Service with Avaya IP Telephony Networks; Nov. 2002.
Trends 911 over VoIP: whose responsibility?—Communications News; Jul. 2004.
Panduit—Discover the PANVIEW Solution; Jul. 2003.
3COM NJ200 Network Jack Management Feature: Location Mapping; Sep. 2003.
3COM Solution Case Studies: University of Utah Hospital, dated not available.
3COM Product Details—3COM NBX 100 Communications System, dated not available.
3COM Unveils Next Generation of Internet Protocol Business Phone—Press Release; Mar. 4, 2004.
3COM Product Details—3COM Network Jack & IntelliJack Switch Family Overview, dated not available.
3COM Application Guide—Expanding User Connectivity in Education; Feb. 2004.
3COM Data Sheet—3COM Network Jacks; Dec. 2003.
3COM Small Office Solutions—A Guide to Small Office Networking; Sep. 2003.
3COM and Siemon to Deliver World-Class Connectivity—Press Release; Apr. 13, 2004.
3COM Product Details—3COM SuperStack 3 NBX Networked Telephony Solution, dated not available.
Cisco "Catalyst Inline Power Patch Panel" Data Sheet; May 2000.
3COM Product Details—3COM Power over Ethernet Multiport Midspan Solution, dated not available.
3COM Product Details—3COM Network Jack NJ200.
IEEE Standards for Local & Metropolitan Area Networks; Jul. 1997.
IEEE Power Over MDI Study Group Meeting Minutes; Sep. 1999.
AT&T Technical Journal; Jul.-Aug. 1985.

* cited by examiner

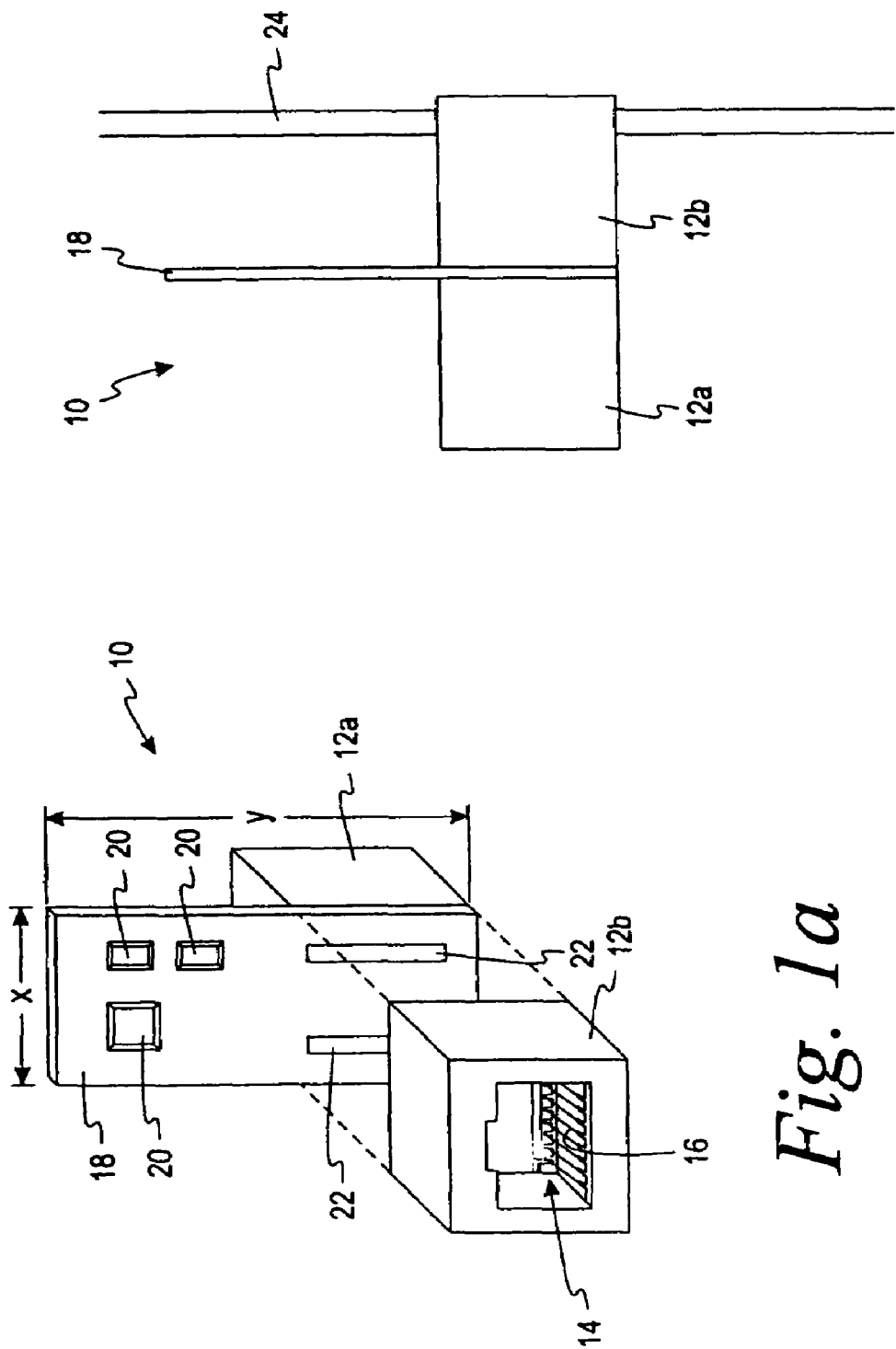

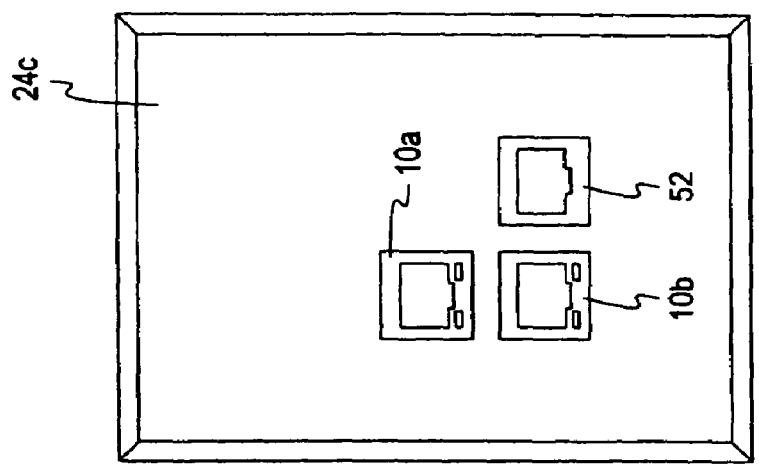
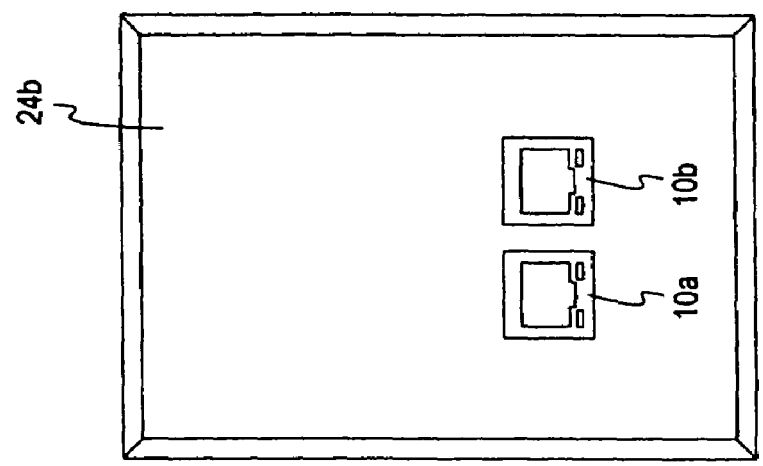
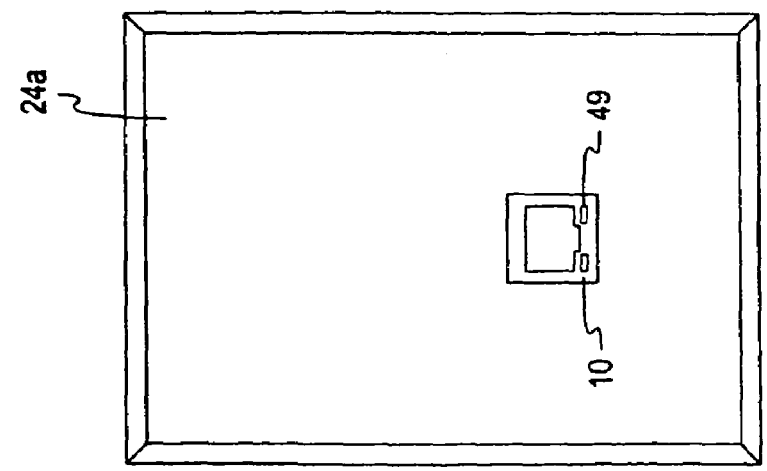

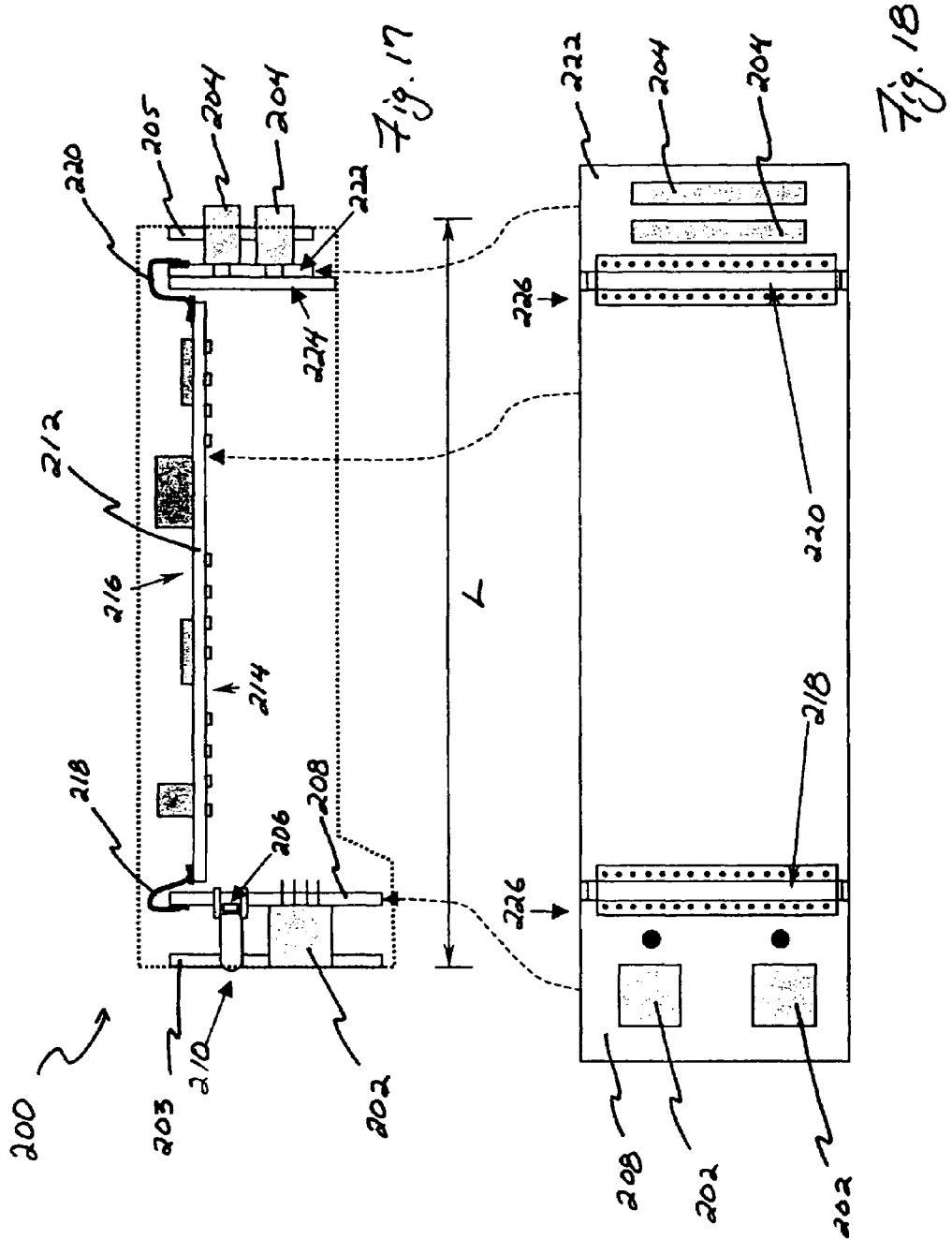

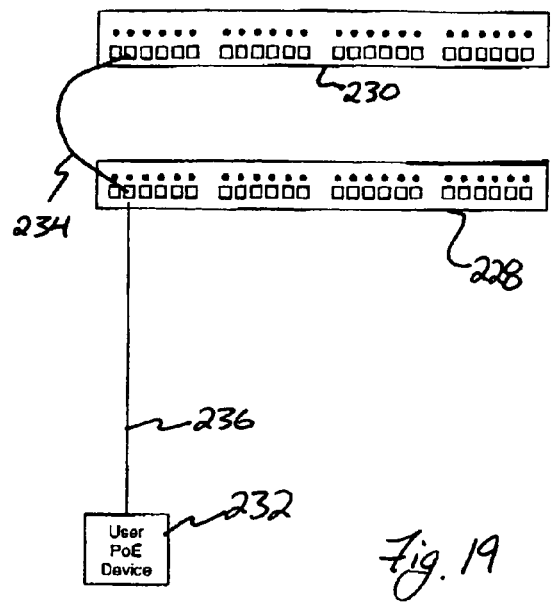
Fig. 19
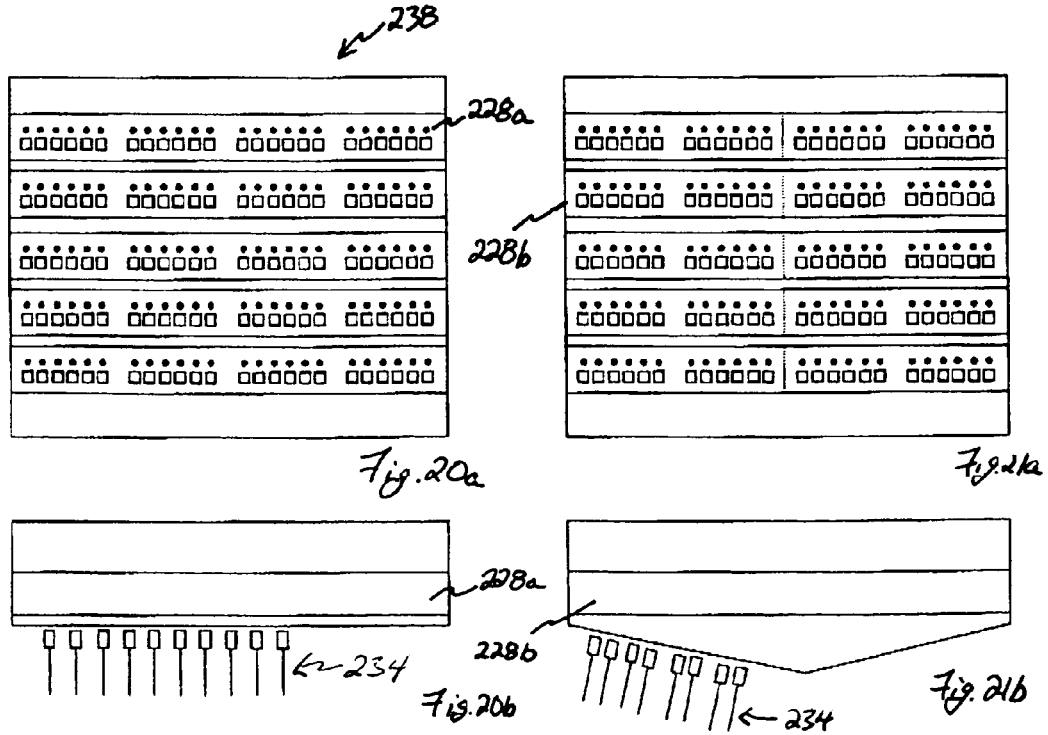
Fig. 20a  Fig. 21a
Fig. 20b  Fig. 21b

POWERED PATCH PANEL

CROSS-REFERENCE TO RELATED APPLICATIONS

This application claims priority to and incorporates by reference in its entirety U.S. Provisional Application Ser. No. 60/567,765, entitled "Powered Patch Panel," filed on May 3, 2004.

FIELD OF THE INVENTION

This invention is directed generally to communications components and more specifically is directed to systems and methods for managing communications networks using active jacks.

BACKGROUND OF THE INVENTION

The use of a local area network (LAN) to serve a wide range of communication needs has continued to escalate, with networks growing larger and denser. Issues with documenting and managing LANs have likewise increased the need for timely response when connectivity problems arise. This is even more important with the advent of voice over internet protocol (VOIP) replacing the function of the traditional phone network, but now operating over the same LAN as data services. Local area networks are subsuming more and more of the responsibility for carrying the total electronic communication capability of a business or home.

A system which provides documentation, management and trouble shooting capabilities should do so while keeping the need for human involvement at access points or patch panels to a minimum. Traditionally, telephone networks and data networks have been maintained as two separate networks with their own wiring requirements and peculiarities. This has largely been due to the regulatory requirements on telephone service to supply life line capability and electrical issues such as a relatively high DC ring-tone voltage.

In many respects, LAN wiring schemes have followed telephone schemes involving wall jack panels leading back to patch panels. However, the cable types and characteristics have remained distinct. This is true for large offices, residential and Small Office-Home Office (SOHO) and Multi-Dwelling Units (MDU) installations.

SUMMARY OF THE INVENTION

According to one embodiment of the present invention, a system is provided which uses an active electronic jack. According to some embodiments of the present invention, the active jack can be located at the wall in an enterprise office, in a patch panel within the cable distribution plant, in a user device or in two or more of these areas. According to some embodiments of the invention, the active jack includes at least two 10/100 Mb/s Ethernet ports and is a network element (NE) on the local area network (LAN). One Ethernet port of the active jack is the network port and connects to the horizontal wiring of the LAN system. At least one other port is the user port into which Ethernet capable devices, such as a personal computer (PC) or a Voice over IP (VOIP) telephone, plugs into in order to gain access to the LAN. The active jack may act as a two port Ethernet switch routing data between the two ports.

According to one embodiment of the present invention, physical location information (i.e., room, floor, etc.) is associated with the MAC address of the active jack. Since the active jack has a MAC address it responds to Address Resolution Protocol (ARP) requests from the network and transmits ARP messages when powered up or queried to indicate presence on the network. The ARP message and the associated physical location information of the active jack can be used to provide information regarding the connectivity of the structured cable system, i.e., the LAN cable plant.

According to one embodiment of the present invention, the active jack is an electronic element that requires a source of DC power which can be obtained from Power Supplying Equipment (PSE) such as an IEEE 802.3AF compliant source. Such sources are deployed in networks as the source of DC power for an attached powered device (PD) such as a VOIP telephone that receives power according to a power-over-network scheme. According to some embodiments of the present invention, the power consumption of the active jack is minimal, with the remaining power forwarded to a powered device (PD) if one is connected.

There are several methods of supplying the active jacks with DC power. According to one embodiment of the present invention, PSE equipment such as an Ethernet switch or IP router is used. According to another embodiment a patch panel or mid-span patch panel can be used. When a patch panel is equipped with active jacks, a managed structure cable PSE system is obtained. The scope of management that a patch panel has can be enhanced if an active jack is used between the patch panel and the end device.

Current methods of cable plant management and security rely on having the state of the horizontal cable system and/or patch panels remain fairly constant. Further, if changes occur it is required that they are well documented and manually entered in the security/management system database. According to one embodiment of the present invention, use of active jacks facilitates monitoring the state of the patch cords and the horizontal cable system to provide a managed, structured cable system. If there is a removal or movement of a particular cable, the active jacks connected by the cable will lose upstream network connection. An active jack in a patch panel can detect the change periodically, for example, via once-per-second "heart beat" IP transmissions to the upstream switch. Because the PSE and PD communicate, the PSE can instantaneously report opens in the patch cord. Optionally, an active jack can send a message to a neighboring active jack to report communication problems. When the connection is re-attached, the active jack may send out an ARP message to indicate that it is back on line with any other devices connected to it. As the connection is re-established the switch port to the patch panel port is thus identified, an important aspect to managing the patch cord connectivity. Since the physical location information can be associated with active jacks, even momentary changes to the cable plant may be recognized and logged.

Since the active wall jack is a managed network element, remote visibility is gained by the management and operations components of a communications network. The active jack provides for remote monitoring, obviating or reducing the need to send out a technician to determine the state of the equipment. Service, can be remotely suspended or re-instated. Furthermore, end point devices which connect to a network using active jacks can be inventoried and controlled as well.

According to some embodiments of the present invention, these management and security aspects are utilized when customers use Soft IP phones or VOIP external hardware phones. The active wall jacks can offer power over Ethernet (to power the phone) and/or provide a physical location address to support E911 service.

To support lifeline VOIP, PSE switches may be used to ensure that all the enterprise switches have enough DC power to survive an AC outage. The internal switches will continue to direct and manage VOIP calls to the outside world but deny other IP data transactions. According to one embodiment of the present invention, an advantage of the power patch panel with the active jack is that it can allow the upstream switches to power down during an AC power outage. The traffic can then be directed to a "lifeline" VOIP gateway from the patch panel, with the lifeline VOIP gateway supporting voice traffic and/or a reduced volume of data traffic.

According to one embodiment of the present invention, a patch panel is provided for supplying power to powered devices via communications cabling. Power may be provided under the IEEE 802.3af standard or via another protocol such as a proprietary protocol.

BRIEF DESCRIPTION OF THE DRAWINGS

In the drawings:

FIG. 1a is an isometric view of an active wall jack;

FIG. 1b is a side view of an active wall jack;

FIGS. 3a, 3b, and 3c illustrate different configurations of active and standard wall jacks in outlet panels;

FIG. 17 is a cross-sectional view of a powered patch panel assembly according to one embodiment of the present invention;

FIG. 18 is a top view of a powered patch panel circuit assembly according to the embodiment of FIG. 17;

FIG. 19 is a block diagram showing the use of a powered patch panel according to one embodiment of the present invention;

FIGS. 20a and 20b are, respectively, front and top views of straight powered patch panels in a rack environment; and FIGS. 21a and 21b are, respectively, front and top views of angled powered patch panels in a rack environment.

DETAILED DESCRIPTION OF THE ILLUSTRATED EMBODIMENT

Figure 2A:
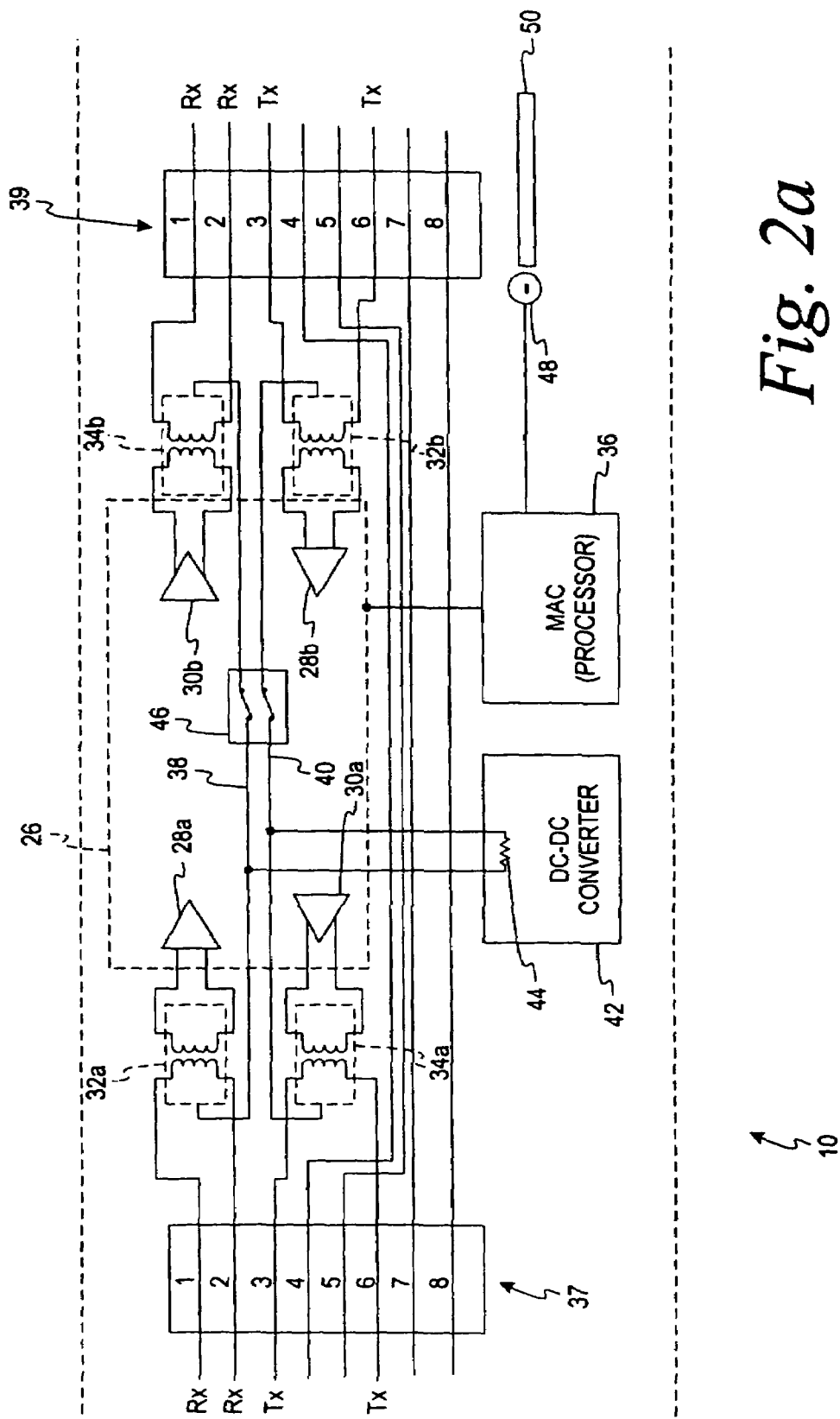
FIG. 2a is a schematic diagram of an active wall jack.

Referring now to the drawings, and initially to FIG. 1a, an isometric construction view of an active jack 10 is shown. The active jack 10 comprises two housings 12a and 12b which can form plug receiving openings 14 as shown in the drawing for the housing 12b. According to an alternative embodiment of the present invention, one connector of the active jack 10 is a pug and the other connector is an insulation displacement connector (IDC). The housings 12a and 12b may be of a type used for communication connectors as described more fully in U.S. Pat. No. 6,371,793, "Low Crosstalk Modular Communication Connector," by Doorhy et al., issued Apr. 16, 2002 which is incorporated herein in its entirety by reference. Mounted within the plug receiving opening are a plurality of conductors 16 which form a resilient contact with a communications plug when the plug is connected to the active jack 10. The conductors 16 are led through the housing of the active jack 10 to make contact with the printed circuit board (PCB) 18. According to one embodiment of the invention, the PCB 18 has an x dimension of approximately ⅝ inches and a y dimension of approximately 2 inches and is of a multi-layer construction with a maximum copper area fill for heat dissipation, and is capable of supporting electronic components 20. The housing is shown in an exploded view away from the circuit board 18 to expose thermal contacts 22 which in one embodiment aid in conducting heat from the circuit board 18 and components 20 to the housing components such as component 12b. The active jack 10 is shown in FIG. 1b in relation to a mountable faceplate 24 of the type typically used as communication ports in wall locations.

According to one embodiment of the present invention, the thermal design of the active jack 10 supports the environment within the enclosure of a data outlet. Since according to some embodiments there is virtually no airflow in this enclosure, heat dissipation is not effective. The active jack design may incorporate a low thermal resistance contact to the outside of the enclosure through the connector housing 12b, as shown in FIG. 1b. In another embodiment of the current invention the housing is constructed of a high thermal conductivity material, such as metal-impregnated material, to aid in the dissipation of generated heat. In an alternative embodiment of the present invention, the electronic components 20 on the printed circuit board 18 are provided within one or both of the housings 12a and 12b of the active jack 10.

Turning now to FIG. 2a, a schematic drawing of an active wall jack 10 according to one embodiment of the present invention is shown. The components of the active jack unit 10 according to one embodiment of the present invention are mounted on the PCB 18. The components shown in FIG. 2a are shown as functional units which may be realized in various forms of integration. The components include an at least dual port Ethernet physical device (PHY) 26 comprising receivers 28a and b and transmitters 30a and 30b. While a dual port Ethernet device is shown in FIG. 2, it is to be understood that the principles of the present invention can be applied to active jacks having more than two ports, as further discussed below.

The receivers 28 and transmitters 30 are electrically connected to respective receive transformers 32a and b and transmit transformers 34a and b. The receive transformers 32a and b and the transmit transformers 34a and b are further electrically connected to a plurality of conductors (ref 16 in FIG. 1)

of the respective housings 12a and b. The conductors may take the form of a network-side connection 37 and a user-side connection 39. The PHY 26 is connected to an Ethernet Media Access Controller (MAC) processor 36 which functionally forms a two-port Ethernet switch.

According to some embodiments of the present invention, power for the circuit of the active jack 10 is obtained from an IEEE 802.3AF compliant PSE source which according to one embodiment supplies negative common-mode voltage which is extracted from the center tap of the receive transformer 32a to a negative rail 38 and a positive common-mode voltage which is extracted from the transmit transformer 34a to a positive rail 40. The IEEE 802.3AF standard also allows for the negative and positive lines to be switched. A DC-to-DC converter 42 is connected to the negative rail 38 and positive rail 40 and supplies the circuitry of the active jack 10 with power. A resistor 44 is placed across the voltage rails 38 and 40 with sufficient resistance to signal to the PSE the presence of a Power Requiring Device (PD). According to one embodiment of the present invention, the resistor 44 has a resistance of 26 kΩ, though greater or lesser resistances may be used in particular embodiments of the invention. In a power supplying throughput mode, the voltage rails 38 and 40 are electrically connected through an optional switch 46 to the center taps of the transmit transformer 34b and receive transformer 32b to allow other PDs downstream to obtain power from the PSE. The IEEE 802.3AF draft standard does not cover multiple PDs on a given circuit so the power requirements of intermediate PDs such as the active jack 10 must be very small, typically less than a watt. The optional switch 46 may be controlled by the local MAC processor to provide power control over downstream PDs for management and/or security purposes and is discussed further below.

Also shown in FIG. 2a is the MAC processor 36 which controls a light emitting diode (LED) 48. According to one embodiment of the present invention, the MAC processor 36 serves as a network port identification component, storing and providing identification information when requested. There may be two or more such LEDs 48 controlled by the MAC processor 36 in communication links: at least one indicates link status, and at least one other indicates transmit/receive activity. According to one embodiment the LED(s) 48 are mounted on the PC board 18 and light is conducted by a light pipe 50 to the exterior jack housing 12b. In alternative embodiments the LEDs may be mounted on the housing 12 and electrically connected to the PCB 18. According to alternative embodiments, one or more LEDs may be associated with each active jack 10 and with each jack housing 12. According to some embodiments of the present invention, additional LED ports, or different colors of LED light, can be made available to support control or monitoring of endpoint devices. For example, different colored lights or additional lights may be employed to indicate that an installation is or is not complete and to aid in the monitoring and maintenance of cable connections. Such embodiments may provide installation or maintenance personnel with information needed to locate a break in cable connectivity and thereby pinpoint the connection that requires attention.

Figure 2B:
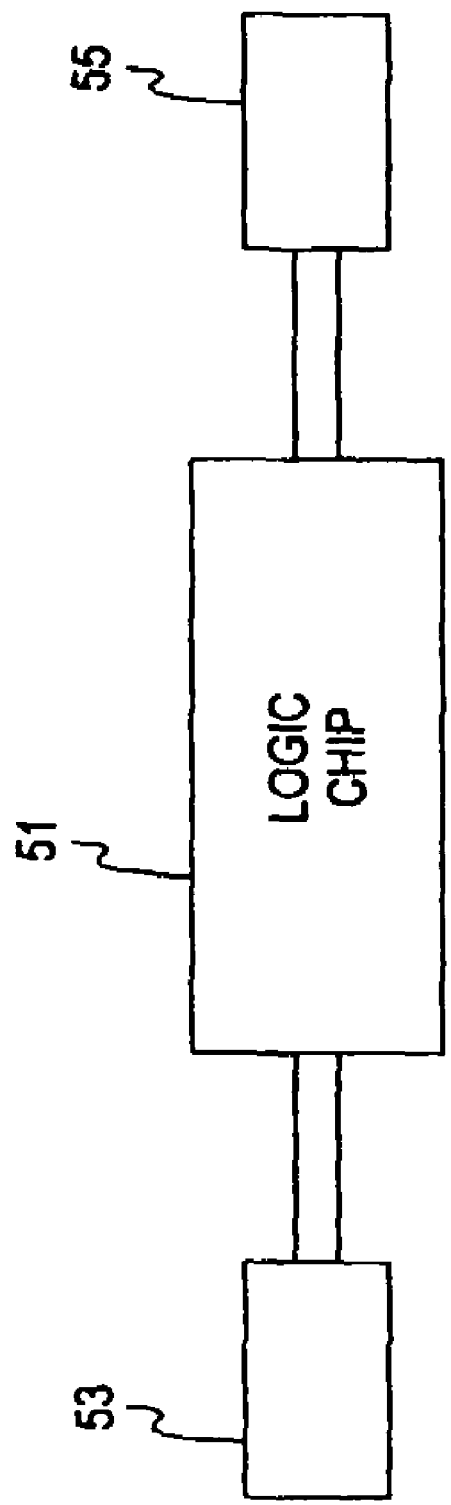
FIG. 2b is a schematic block diagram of an alternative embodiment of an active wall jack.

Turning now to FIG. 2b, an alternative active jack according to one embodiment of the present invention is shown. In the embodiment of FIG. 2b, a logic chip 51 carries out the functions of the active jack, including such functions as the forwarding of communications through the active jack, regeneration of signals by the active jack, monitoring and reporting of data throughput, memory storage for installation instructions and user instructions, logical identification of the active jack, and switching of the active jack to enable or disable communications through the active jack. According to one embodiment of the present invention, the logic chip 51 includes a memory component for storing a template of instructions for an installer to follow and/or one or more data fields for an installer to fill during installation of the active jack. The logic chip 51 is connected to a network-side connection 53 and a user-side connection 55.

Active jacks according to some embodiments of the present invention may be deployed in power-over-Ethernet environments. In these environments, the active jacks may consume the power needed for their operation while falling below the level of power consumption that would identify the active jacks as powered devices in the power-over-Ethernet environment. Active jacks in such an environment forward power for provisioning to powered devices.

Referring now to FIG. 3a, a face plate 24a according to one embodiment of the invention is shown with one active jack 10. Another embodiment is face plate 24b, shown in FIG. 3b, with two active jacks 10a-b. Another embodiment is face plate 24c, shown in FIG. 3c, with two active jacks 10a-b and a passive jack 52. It is to be understood that several alternative embodiments employing multiple active and passive jacks may be implemented in specific installations. Also shown in FIGS. 3a, 3b, and 3c are LED indicators 49 for facilitating installation and maintenance of active jacks.

Figure 4A:
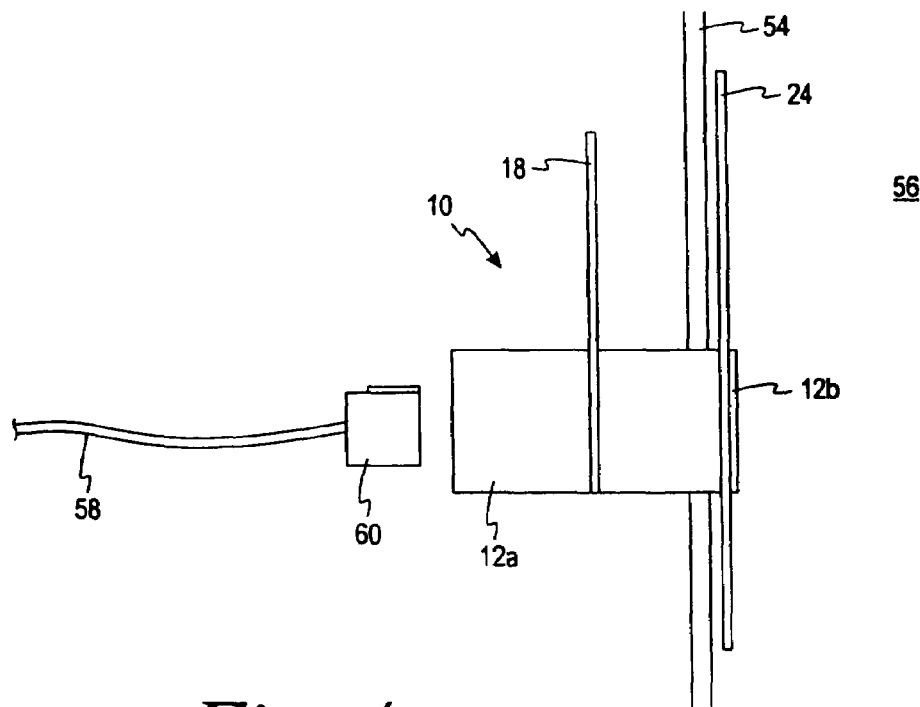
FIGS. 4a, 4b, 4c, and 4d are side views of alternative embodiments of active wall jacks according to the present invention.

Referring now to FIG. 4a, according to one embodiment of the present invention the active jack unit 10 is incorporated into a wall panel mounted in a wall 54 behind a face plate 24 so that the user-side jack housing 12b is accessible within the user area 56 as shown. The active jack unit 10 is connected to a horizontal cable 58 by means of a terminating plug 60, which facilitates testing and repair of either the active jack unit 10 or the horizontal cable 58. Alternatively, the active jack unit 10 can be connected to a horizontal cable via an insulation displacement connector.

Active jacks according to the present invention also support the use of multiple user-side connections and/or multiple network-side connections within one active jack unit. Such embodiments may be useful in implementations in which one user device is connected to more than one network on the network side. Further, more than one user device, or user devices belonging to more than one account owner on a network, may be connected to a single active-jack and access one or multiple networks on the network side of the active jack. Constructions of active jacks having multiple network-side connections also support dual-homing operation for active jacks. In this operation, an active jack can monitor more than one network-side connection for operability. If a primary network connection becomes inoperable or suffers other communications problems, active jacks according to the present invention may automatically switch to a secondary network connection. This provision for redundancy of network connections can significantly enhance the reliability of network access at an active jack employing such a dual-homing system.

Figure 4B:
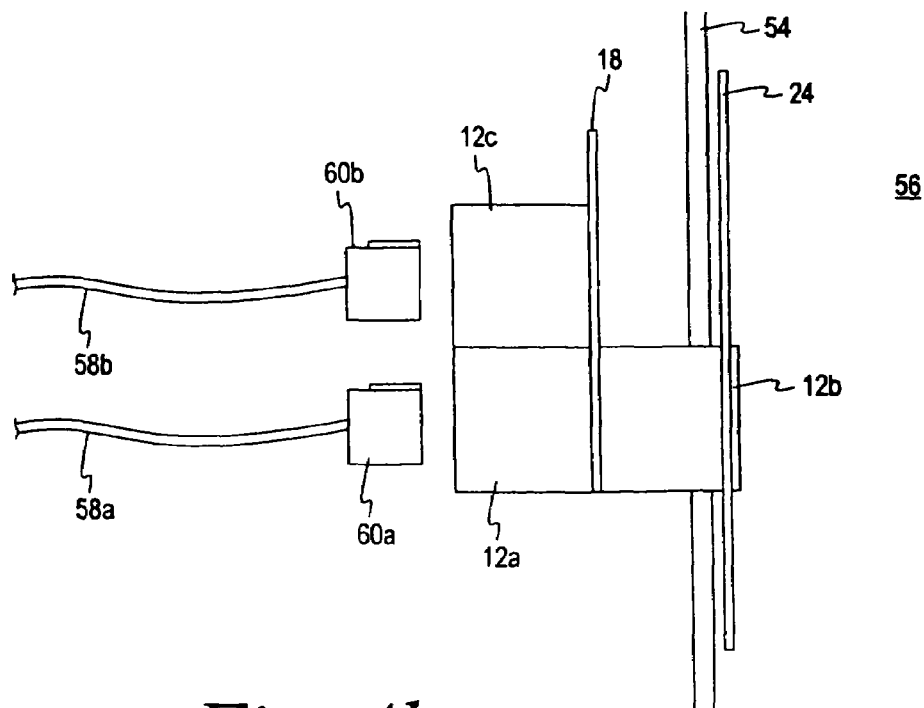
Figure 4C:
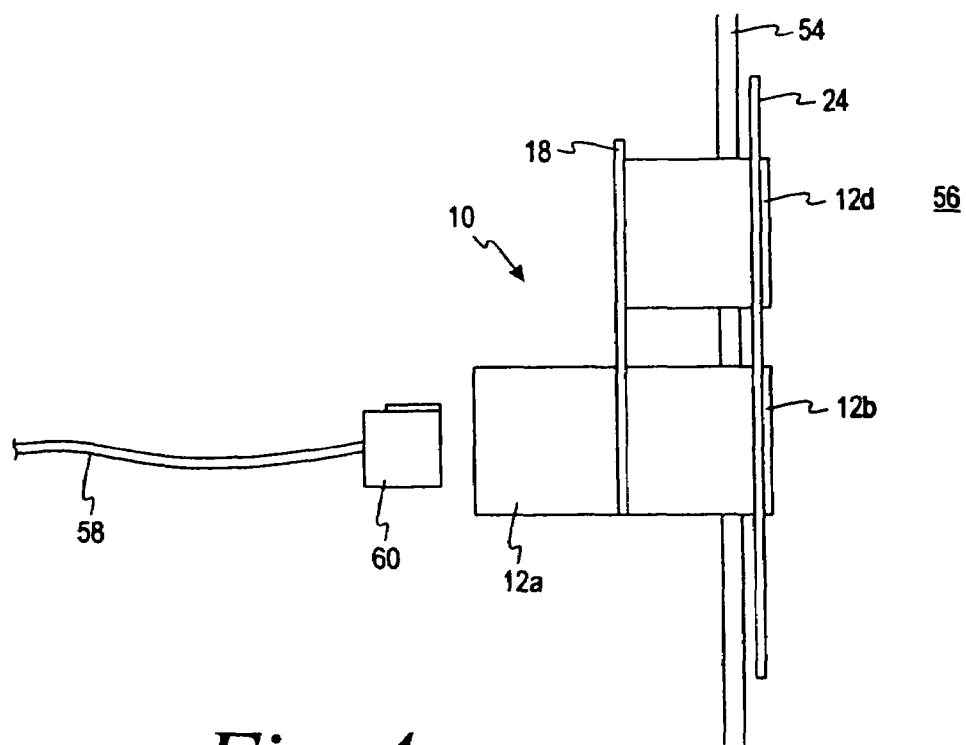
Figure 4D:
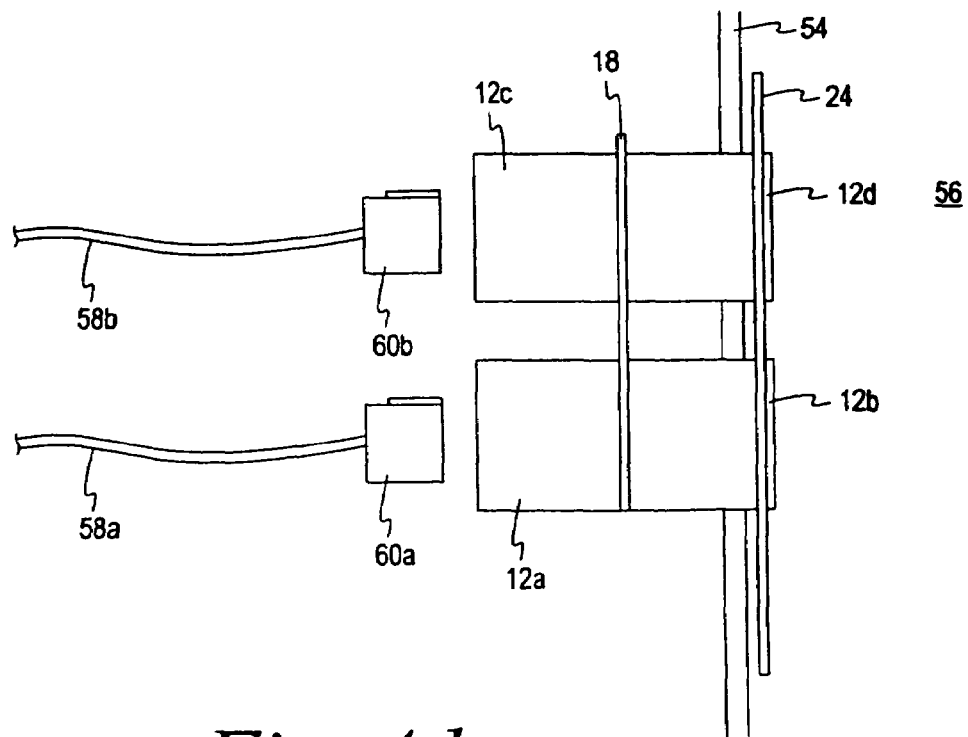

Embodiments of active jacks according to the present invention using multiple user-side and/or network-side connections are shown in FIGS. 4b, 4c, and 4d. The active jacks of FIGS. 4b, 4c, and 4d are incorporated into wall panels, but it is to be understood that they could alternatively be incorporated into other network components as desired. FIG. 4b shows an active jack having two network-side connector housings 12a and 12c for connection to two network-side terminating plugs 60a and 60b which in turn are connected to one or more networks via two horizontal cables 58a and 58b. The active jack of FIG. 4b allows for one connection in a user area 56 to have access to more than one network connection.

While two network connections have been shown, it is to be understood that more than two network connections may be employed on the network side in this and other embodiments.

Turning now to FIG. 4c, an active jack having two user-side connector housings 12b and 12d for connection to two user devices. One network-side connector housing 12a is shown for connection to a network-side terminating plug 60, which in turn is connected to a network via a horizontal cable 58. This embodiment allows two user devices to be connected to the active jack assembly. Further, because each of the user-side connector housings 12b and 12d can support the functionality of a separate active jack, the embodiment of FIG. 4c enables all active jack functions to be equally applied to more than one user-side device via a direct wall connection. While two user-side connections have been shown, it is to be understood that more than two user-side connections may be employed in this and other embodiments.

FIG. 4d shows an active jack embodiment in which two network-side connector housings 12a and 12c and two user-side connector housings 12b and 12d are employed. In this embodiment, more than one user device, such as a VOIP phone or other user device, may be connected to more than one network-side connection. The embodiment of FIG. 4d allows for a dual-homing application for an active jack wall assembly having multiple user-side active jacks. Thus, multiple users or multiple user devices on the user side 56 of the jack may be provided with network redundancy in the event of failure of a primary network or other communications problems.

Figure 5:
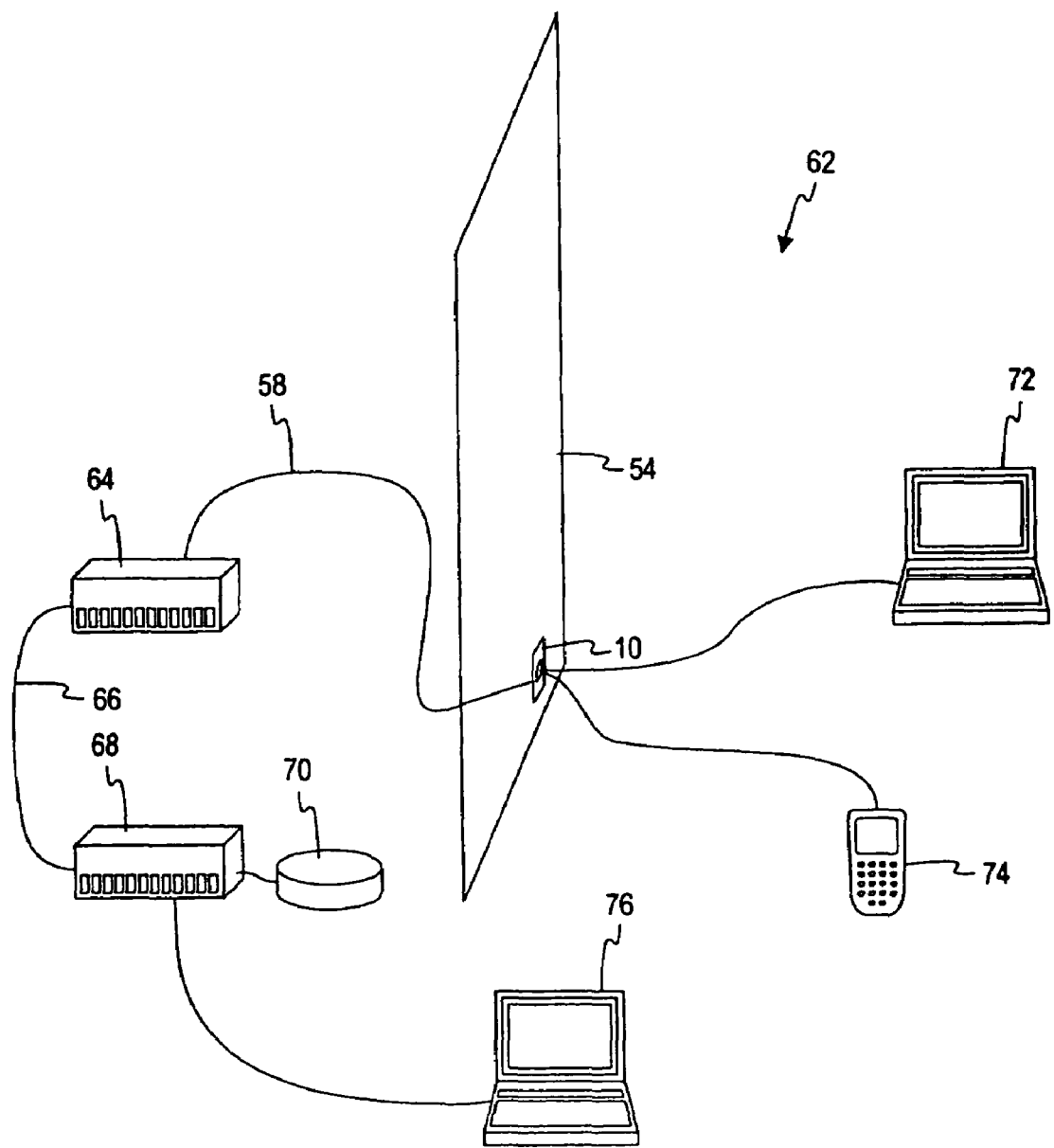
FIG. 5 is a block diagram illustrating the entry of location data into an active wall jack.

In a communication network it is desirable to be able to identify the physical location of each user. This is especially important in supporting an electronic emergency 911 database for VOIP, in which the location information can greatly facilitate the ability of personnel to respond to an emergency. Location information can also support a managed, structured cable plant. Referring now to FIG. 5, an active jack 10 mounted in the wall 54 of an area 62 connected via a horizontal cable 58 to a patch panel 64 and through a patch cord 66 to an IP router 68 is shown. According to one embodiment of the present invention a specific active jack 10 is associated with its physical location information in a database. To associate the active jack 10 with its physical location, the physical location of the area 62 may be associated with information regarding the active jack—e.g., its MAC address—in a database 70, which according to some embodiments is an E911 database or a database recognized by an E911 program.

Further, devices within the area 62 and connected to the active jack 10 may be identified according to item type or item model, thereby enabling an inventory of items connected to active jacks 10 and the real-time monitoring of equipment connected to networks via active jacks 10. For example, in a school network active jacks distributed in classrooms allow for centralized monitoring of equipment connected to the school network via active jacks. Thus, if a particular computer or optical projector were needed, the physical location of that computer or optical projector—in addition to the logical location of the device in the computer network—can easily be determined as long as the equipment is connected to the network. According to one embodiment of the present invention, inventory information corresponding to the physical location of devices connected to the network may be associated with a graphical map of a network's physical locations to provide a real-time depiction of device locations within a network.

According to one embodiment of the present invention, personnel engaged in the installation of an active jack may associate the active jack and the active jack's physical location by entering the location information using an application running on a PC 72 which communicates with the connected local active jack 10 which in turn, as stated above, has its own MAC address. The association of the MAC address of the local active jack 10 with the location data can be recorded on the PC 72 and later transferred to a management database 70 after a work period of active jack installations. In an alternative embodiment, the associated information is input directly into the database 70 over the connected network. In another method, personnel use a test instrument 74, which provides a simpler interface to achieve the same results. The test instrument 74 can also perform a variety of network tests to ensure proper network installation and connectivity. In yet another embodiment a networked computer 76 is used to update the location database based on work order entry information. The database 70 as depicted in FIG. 5 may reside as part of a network manager system, as part of the IP router 68 or as part of a voice gateway for VOIP systems.

Figure 6:
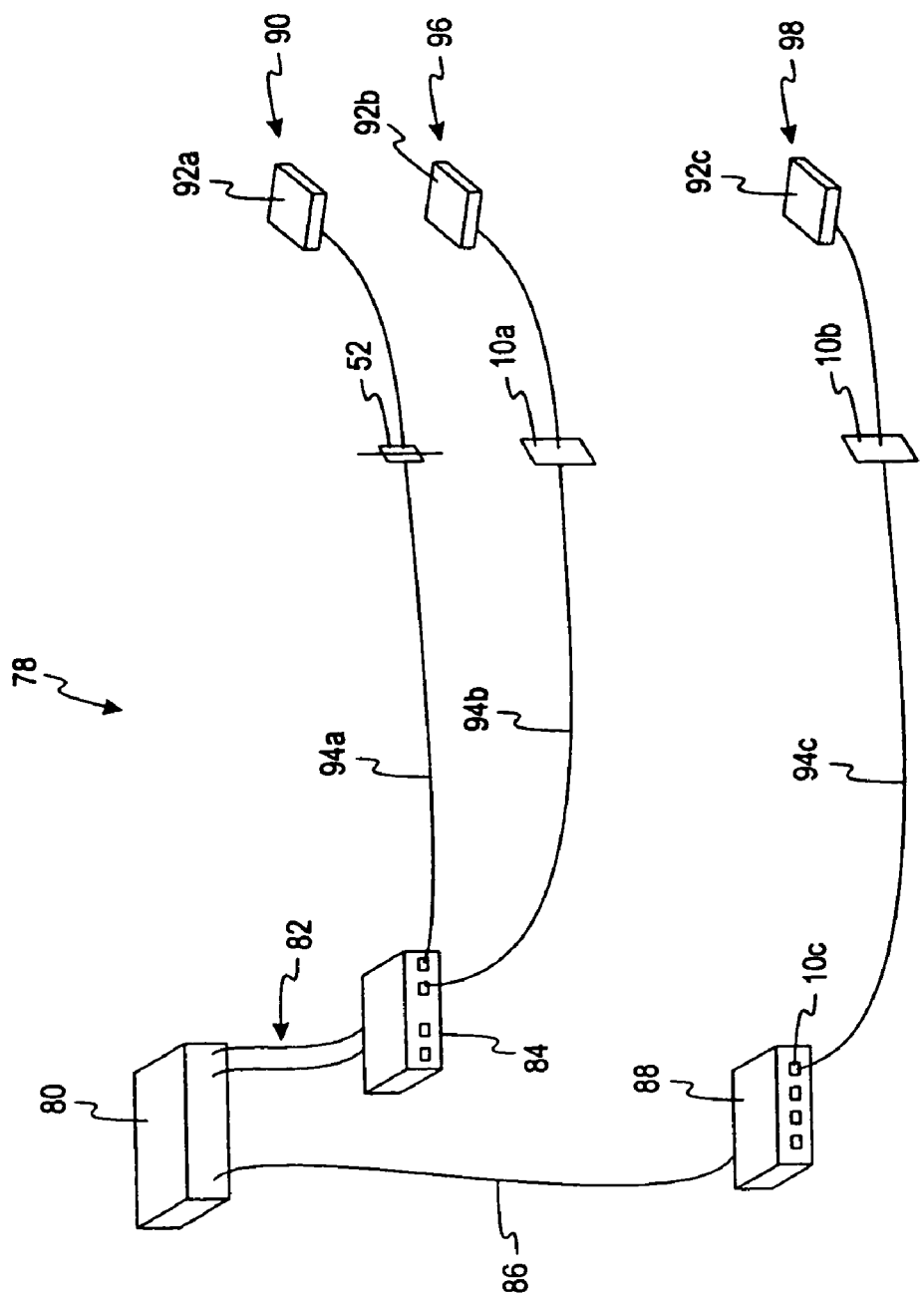
FIG. 6 is a block diagram illustrating power distribution and cable management schemes using for active wall jacks.

Turning now to FIG. 6 three connection paths are shown to illustrate methods of managing a structured interconnection cable network 78 using active jacks 10. The structured network used for this example is a PSE IP switch/router 80 connected by patch cords 82 to a first patch panel 84 having passive jacks as ports and by a patch cord 86 to a second patch panel 88 which has active jacks 10c as ports. In the first connection path 90 of FIG. 6, a user device 92a, such as a VOIP phone, is connected via a passive jack 52 to the network 78. User devices for use with this and other embodiments of the present invention may be phones such as VOIP phones, computers, and the like and may be powered devices that draw power from network connections. In the first connection path 90 if there is an open connection anywhere in the cable system or if the device 92a is a powered device and is disconnected from the wall jack 52, the device 92a will power down. This can be detected by the PSE IP switch/router 80 but the reason—e.g., cable plant issue, an office connection or device powering down—cannot be determined. If a patch cord 82 or the connecting horizontal cable 94a were moved the movement would only be detected as the powering down of the device 92a. A patch panel containing active jacks as ports may be considered a managed interconnect patch panel because it enables the monitoring and control of connections similarly to a cross-connect patch panel system while requiring only one patch panel.

In a second connection path 96 of FIG. 6, a user device 92b is connected to the network 78 by means of an active wall jack 10a. In this scenario a cable movement or an open circuit in either the patch cord 82 or the horizontal cable 94b causes the user device 92b (if the user device is a powered device) and the active jack 10a to power down. At this time the PSE IP switch/router 80 may note in a database that the user device 92b and the active jack 10a are no longer present, i.e., drawing power. When the power is restored (via a cable change or repair in the case of an open circuit) the PSE IP switch/router 80 notes that a powered device is connected due to the sensing of a power request at the PSE IP switch/router 80. Furthermore, the active jack 10a and the device 92b send Ethernet ARP messages on powerup indicating presence on the network. If only the device 92b is disconnected then its loss will be detected by the PSE IP switch/router 80 and the active jack 10a can still be reached and queried by management software. Further, when only the user device 92b is disconnected and later reconnected, on power restoration only the re-powered device 92b will respond with the Ethernet ARP message. The active jack 10a and thereby the user device 92b can be associated with a given physical location, assisting management with notification of disrupted service.

When active jacks are deployed in a patch panel 88, as shown in a third connection path 98, the active jacks in the wall facilitate the maintenance of a structured and managed cable plant. However, there is some additional functionality that can be derived by having active jack technology at the patch panel and the client destination point. In the third connection path 98, a user device 92c is connected to the network 78 by means of an active wall jack 10b and a horizontal cable 94c to a patch panel 88 which contains active jacks 10c. The patch panel 88 is, in turn, connected via patch cords 86 to the PSE IP switch/router 80. In this scenario open circuit breaks, cable movements, and/or movement of the user device 92c can be isolated and separately identified as the connecting network is segmented by active devices 92c, 10b and 10c. Each of the active devices mentioned respond to Ethernet ARP requests and produce Ethernet ARP messages on power up situations. For example, if there is a movement of the patch cord 86, the user device 92c, the active jack 10b and the patch panel jack 10c will all power down. At this point the PSE notes that the user device changed state in the amount of power requested and can thus distinguish between only a user device 92c removal and horizontal or patch cord open circuits and/or movements. When power is restored all previously powered down devices send Ethernet ARP requests on the network indicating presence. Furthermore, if the interconnection between a port of the PSE device 80 and an active port on the patch panel 88 or between the patch panel 88 and the active jack 10b has been changed then the location of the change can be determined and managed.

Figure 7:
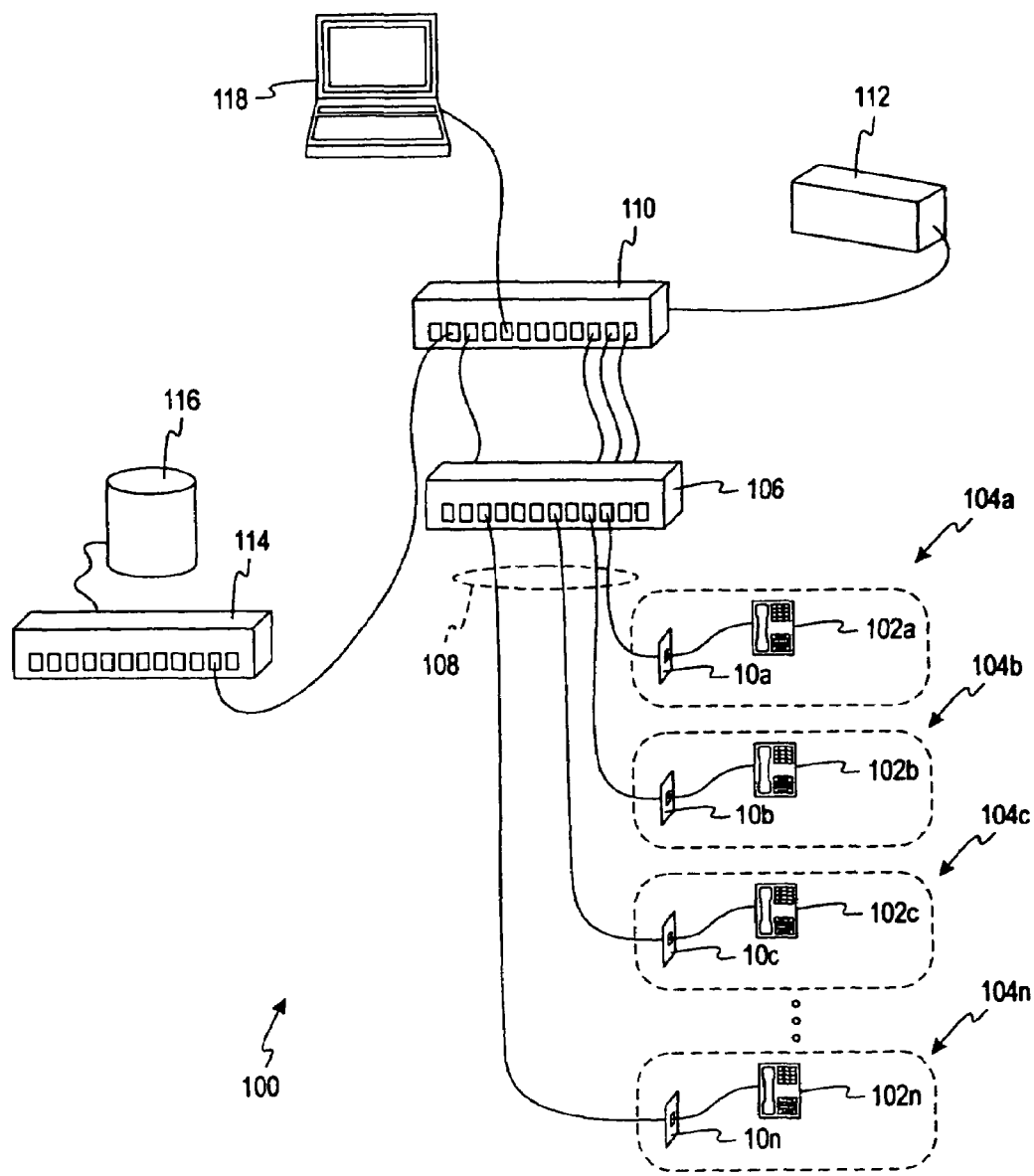
FIG. 7 is a block diagram illustrating a communications network using active jacks according to one embodiment of the present invention.

Referring now to FIG. 7, the use of the active jack 10 to control network access to a LAN 100 is illustrated. In this embodiment, user devices 102a-n, such as VOIP phones, are attached to the network through respective active jacks 10a-n in respective locations 104a-n. While only four user devices are shown in four locations, it is to be understood that systems and methods according to the presentation may be used with a number of devices in a number of locations. The active jacks 10a-n are connected to a patch panel 106 by a horizontal cable plant 108. The patch panel 106 is connected to a PSE IP router device 110 which is connected to an uninterrupted power source (UPS) 112 and supplies power via the IEEE 802.3AF draft standard to downstream power requiring devices, e.g. 102a-n and 10a-n. The PSE device 110 is connected to an IP router 114 which also serves as a VOIP gateway and is connected to or contains a database 116. A network manager 118 is also connected to the LAN 100 and in one embodiment of the present invention is capable of monitoring and controlling the various network elements such as the routers 110 and 114 and the active jacks 10a-n via Simple Network Management Protocol (SNMP) messages. According to some embodiments of the present invention, network managers execute network management programs for implementing network management tasks.

As shown in FIG. 2, the active jack 10 has a DC power switch 46 which is controlled by the local processor 36. The active jack 10 contains the switch 46 and thus both the data connectivity and the power to any downstream device can be controlled, for example by the local processor 36, enabling enhanced security features such as endpoint isolation, device inventory, and authorization. The network manager 118 can control the network elements to disable network access to any endpoint either at periodic intervals or in response to an external stimulus such as an unauthorized request for service. This may be accomplished by the network manager 118 sending signals to processors 36 located at active jacks 10 to open the switches 46 at specific locations, thereby preventing data flow at those locations. There are applications whereby during certain times of the day, access to a managed network can be restricted. Use of the active jack 10 in networks also permits usage monitoring. For example, it may be useful to restrict access from some office to sensitive or restricted internet or intranet sites or locations. If an unauthorized access is initiated, then the network manager 118, aware of the intrusion, can have the option of shutting the active jack 10 off as well as logging the location of the active jack that the requesting device is using.

Figure 8:
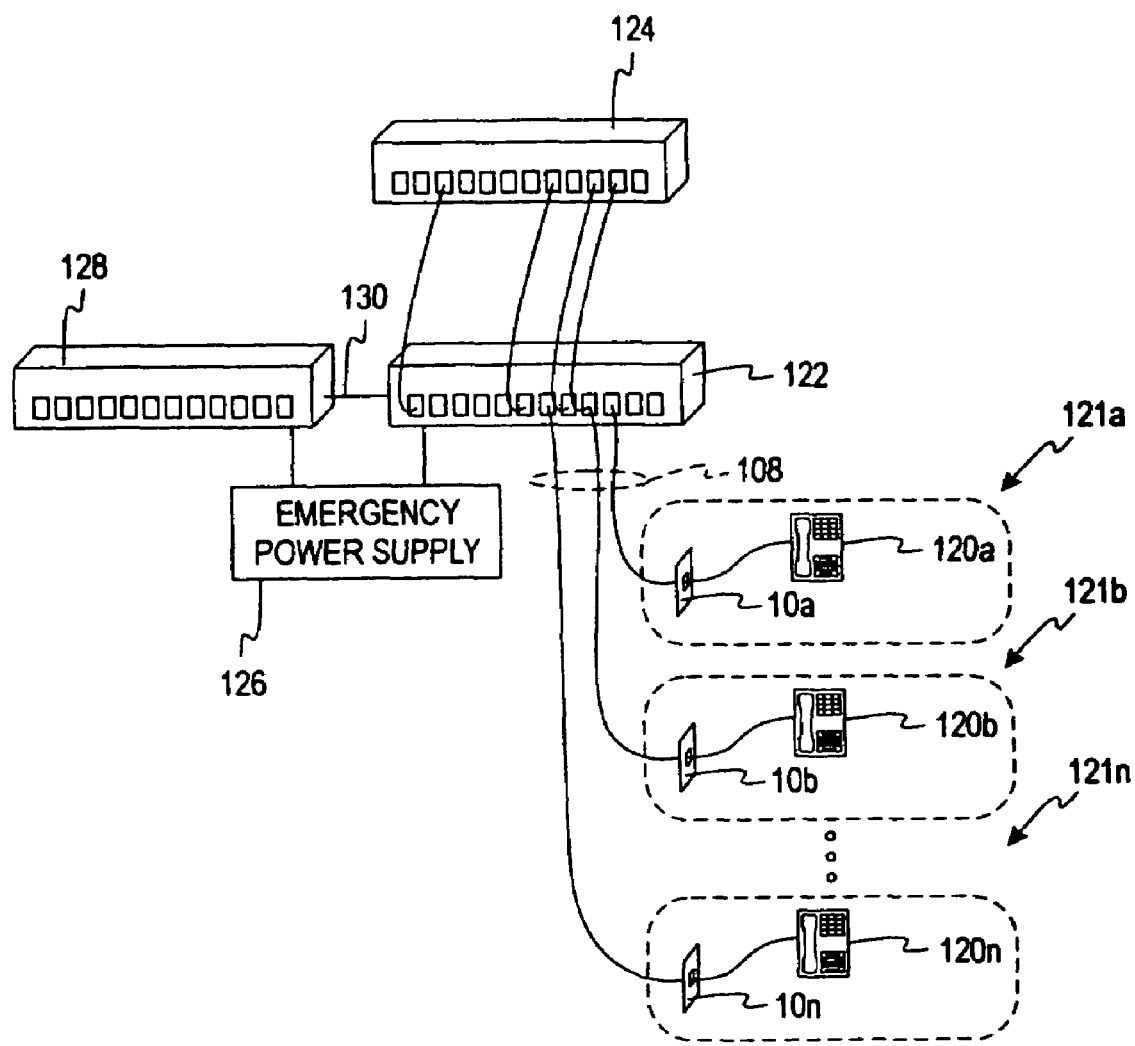
FIG. 8 is a block diagram illustrating an emergency powering system incorporating patch panels with active jacks.

Referring now to FIG. 8, a system according to one embodiment of the present invention of providing emergency power via a patch panel as well as managing the structured cable system using active jacks at the patch panel is illustrated. User VOIP phones 120a-n in user areas 121a-n are connected through active wall jacks 10a-n via a horizontal cable plant 108 to a powered patch panel 122. The powered patch panel 122 is connected to an upstream IP switch 124, which during normal operation is the routing device for the VOIP phones 120a-n. The powered patch panel 122 is also connected to a local emergency power supply 126, such as an emergency battery, and an emergency voice gateway 128, which is also connected to the local emergency power supply 126. In an electrical outage, the upstream switch 124 may power down and the power patch panel 122 may divert voice traffic to the local gateway 128. According to some embodiments, data services may be curtailed in a power outage but voice services are maintained for emergency situations.

According to one embodiment of the present invention active jacks are provided within the patch panel 122 as three-ported devices. In this embodiment, one port is used for the user connectivity, one port for network connectivity and the third port for connectivity to the emergency voice gateway 128. According to another embodiment of the present invention the connectivity to the emergency gateway 128 from the patch panel 122 is via a shared Ethernet connection. According to yet another embodiment of the present invention, the patch panel uses a network-side switching element to connect the network ports of the patch panel active jacks to a shared Ethernet bus 130.

Figure 9:
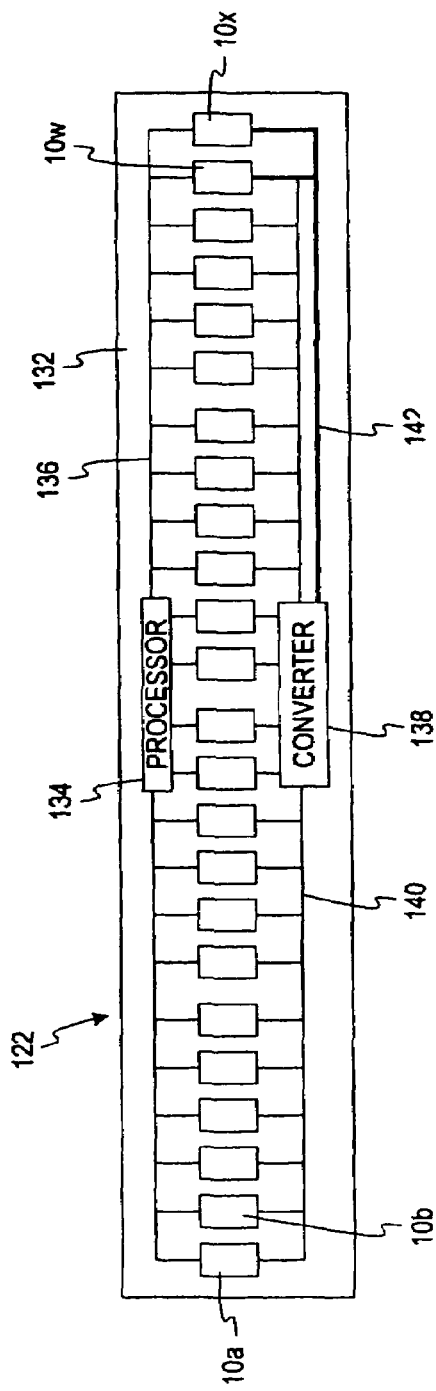
FIG. 9 is a schematic view of a patch panel with active jacks and shared circuitry.

Referring now to FIG. 9 a block diagram of one embodiment of a powered patch panel 122 is illustrated. In this embodiment active jack units 10a-x of a 24-port patch panel 122 are mounted on a common printed circuit board 132. A processor 134 is electrically connected to and controls the activity of the active jacks 10a-x via a bus 136. A DC-to-DC power converter 138 converts an incoming power supply to a power supply as required by local circuitry. For example, the power converter 138 may convert an incoming 48 volt power supply to 3.3 volts required by the local circuitry. The power for the local circuitry is distributed along a power connection 140 to the active jacks 10a-x in order to forward the power to downstream powered devices. According to one embodiment, the active jack 10x is assigned to extract 48 volts from an upstream PSE and distribute the 48 volts via an incoming power connection 142 to the DC-to-DC converter 138. Optionally, alternative active jacks such as the active jack 10w may also be used for power extraction, as for example when drawing power from a redundant upstream PSE. The DC-to-DC power converter 138 may determine from which source (e.g., 10w or 10x) power will be used. In an alternative embodiment an additional jack or jacks may be employed for the sole purpose of power extraction.

Figure 10:
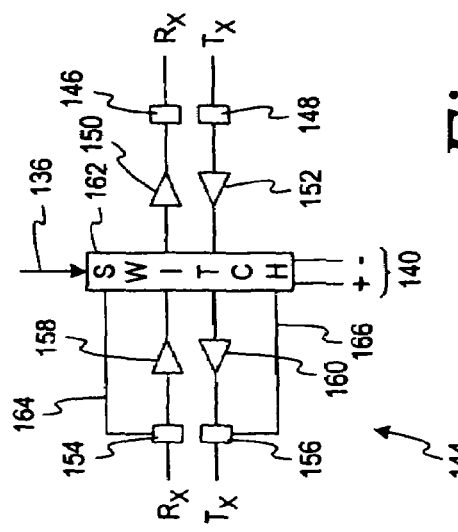
FIG. 10 is a schematic view of an active jack according to one embodiment of the present invention.

Turning now to FIG. 10, an alternative construction for an active jack 144 according to one embodiment of the present invention is shown. The active jack 144 may, for example, be used in the embodiment of FIG. 9, in which a common processor 134 and a common DC-to-DC power converter 138 is used and the individual jacks need not extract power from an upstream PSE. The active jack 144 of FIG. 10 comprises upstream transformers 146 and 148 connected to upstream drivers 150 and 152 respectively, and downstream transformers 154 and 156 connected to downstream drivers 158 and 160, respectively. A switch 162 is operatively connected to the power connection 140 and under processor control via the bus 136 can control the power distributed via downstream power connectors 164 and 166 to the downstream transformers 154 and 156 in order to forward power to downstream powered devices. Thus, only the downstream transformers 154 and 156 need to be center-tapped for the purpose of forwarding power. According to yet another embodiment of the present invention, the switch 162 may also be operatively connected to the receive (Rx) and transmit (Tx) signals for the purpose of interrupting the data connection.

Figure 11:
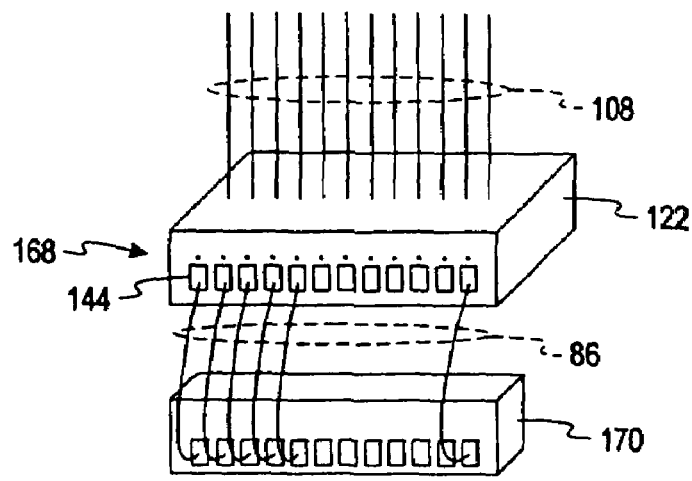
FIG. 11 is a block diagram of a patch panel implementation according to one embodiment of the present invention.

According to one embodiment of a patch panel 122 of FIG. 9, the active jacks 10 have integrated LEDs that aid the installer in either cross-connect or interconnect systems. FIG. 11 illustrates an interconnect system in which LEDs 168 associated with active jacks 10 on a patch panel 122 can be illuminated or flash patterns to aid the installer. For example, LEDs may indicate where patch cords 86 or horizontal cables 108 are to be connected to the patch panel 122. In the embodiment of FIG. 11, the patch panel 122 is disposed along a communication pathway between a PSE IP switch/router 170 and horizontal cables 108. According to one embodiment, illumination of the active jack LEDs is achieved through SNMP messages from a management entity. In addition to the facilitation of installation provided by LED functionality, LEDs also allow for improved cable management following installation by providing maintenance personnel with visual indications of where inoperable cables are located as well as by providing visible instructions for reorganizing cables in a communications network. While only one LED has been shown associated with each of the active jacks 144, it is to be understood that multiple LEDs may be associated with each active jack in some embodiments of the current invention.

Figure 12:
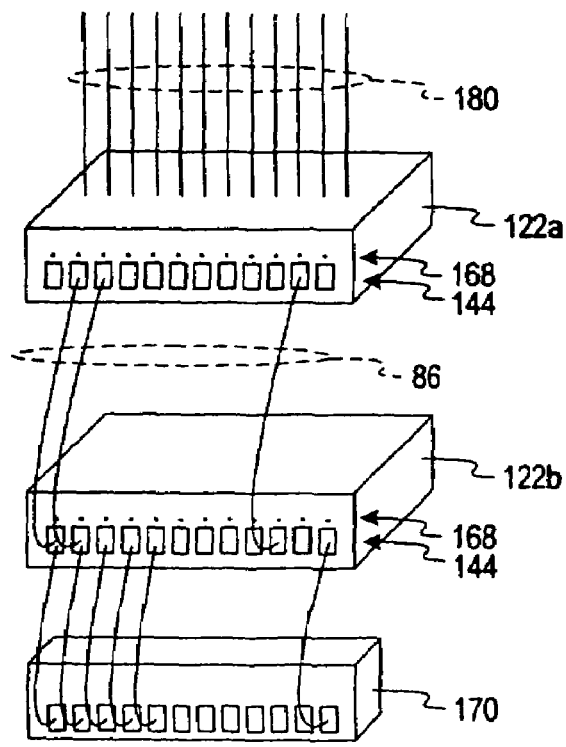
FIG. 12 is a block diagram of a patch panel implementation according to another embodiment of the present invention.

Another embodiment of the present invention is shown in FIG. 12, in which patch panels 122a and 122b are deployed in a cascaded master-slave configuration. Patch panels deployed in the cascaded manner shown in FIG. 12 enable cross-connect systems with LEDs 168 on each panel indicating to an installer where patch cords are to be removed or installed.

Figure 13:
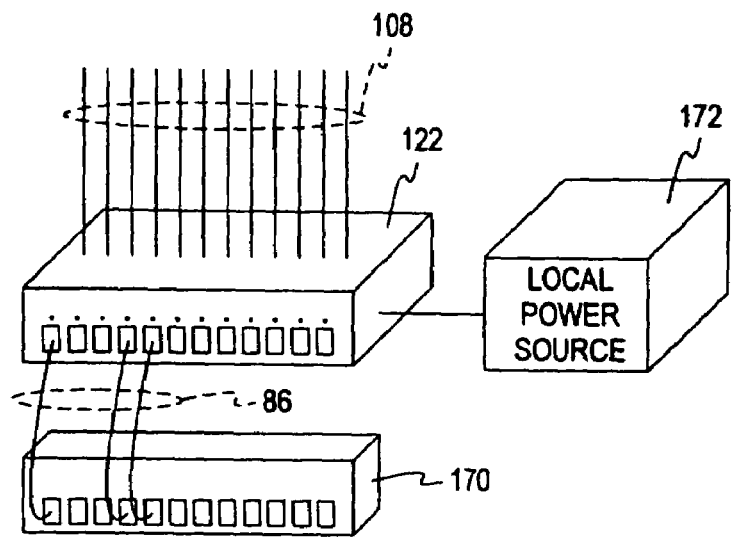
FIG. 13 is a block diagram of a patch panel implementation according to another embodiment of the present invention.

According to one embodiment of the powered patch panel 122 shown in FIG. 13 an electrical supply, such as a 48 volt DC electrical supply, can be obtained from a local power source 172 which may be an AC line PSE or an emergency DC battery pack making the powered patch panel 122 a PSE device. According to another embodiment, a power supply, such as a 48 volt DC electrical supply, can be obtained by means of one of the local jacks 10x, as shown in FIG. 9, from an upstream PSE.

Figure 14:
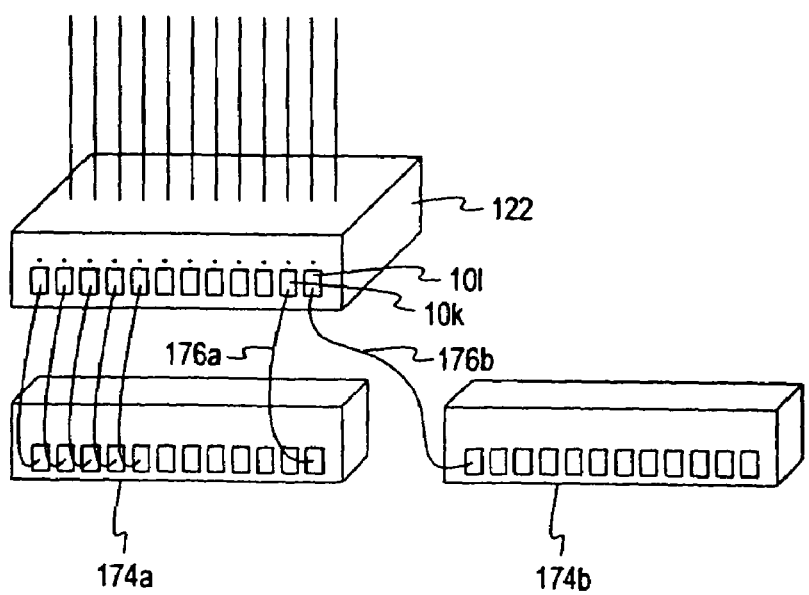
FIG. 14 is a block diagram of a patch panel implementation according to another embodiment of the present invention.

In yet another embodiment, shown in FIG. 14, a power supply, such as a 48 volt DC electrical supply to the patch panel 122, can be obtained from two independent sources, PSEs 174a and 174b, by means of patch cords 176a and 176b using active jacks, such as jacks 10k and 10l, within the patch panel 122, thus providing redundant DC power sources.

Figure 15:
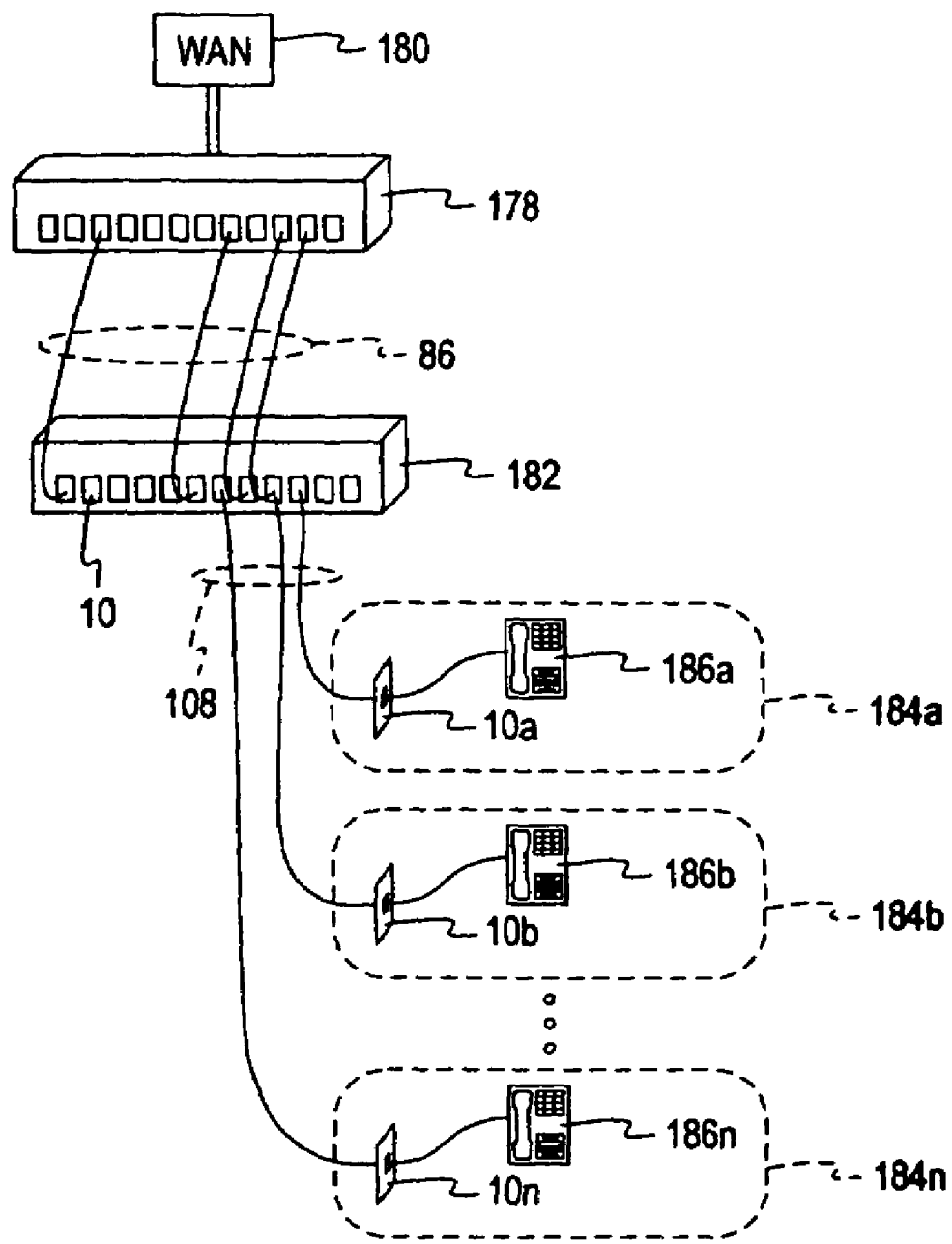
FIG. 15 is a block diagram of a multiple-dwelling unit network according to one embodiment of the present invention.

Referring now to FIG. 15, a multiple-dwelling unit (MDU) according to one embodiment of the present invention is illustrated. Using active jacks allows service activation at individual dwelling units. In addition, security and management of communications for residential and small office/home office (SOHO) applications can be facilitated. A broadband router 178 is connected to a wide area network 180 for external connectivity and to a distribution system within the MDU via patch cords 86 to a patch panel 182, which may be a powered patch panel with powered active jacks. The patch panel 182 may optionally include one or more active jacks 10 for management purposes. From the patch panel 182 a horizontal cable plant connects individual locations 184a-n, which may be individual dwellings. Each location 184a-n includes a wall mounted active jack 10a-n and a user device 186a-n. Each active jack 10a-n has a MAC address and physical location information associated with the active jack. Power for the active jacks 10 and the user devices 186a-n may be obtained from a UPS source connected to the broadband router 178 or the patch panel 182. Integrating active jacks into user areas and/or into the broadband router 178 allows for remote management and diagnosis of cabling infrastructure issues, increased security of the cabling infrastructure, service activation (i.e., turning service on and off) and monitoring, power over Ethernet applications, and indication of devices' physical locations. Performance monitoring is also enhanced because the exact physical and logical network location of a problem connection can be identified centrally by a service provider, without the need for more extensive investigation of basic location issues.

Multiple dwelling unit applications of the present invention, including the benefits of embodiments of active jacks as described herein, may be extended to residential, office, and hotel networks. The distribution of active jacks throughout these networks enables a variety of useful features. One use for active jacks 10a-n distributed throughout a network is the implementation of toll-for-service systems. Such a system may be implemented, for example, in a hotel in which each of the locations 184a-n is a hotel room or a conference room. The active jacks 10a-n enable the monitoring of data throughput and the reporting of data throughput to a network manager. Thus, the network manager may charge a set fee for the amount of data requested or sent by the devices 186a-n. Further, because each of the active jacks 10a-n may be switched on or off by a network manager, the ability to use the active jacks 10a-n in the locations 184a-n may be centrally controlled to allow use of individual active jacks only for those who have paid for use of the active jacks, including the ability to halt data flow through the active jacks 10a-n once a paid-for time period has expired. Payment schemes of payment per data packet or other data unit and time-based payment may be implemented, allowing for the efficient allocation of network bandwidth to those who pay for it. Active jacks may be distributed in a network tree architecture, such that network access by several users of separate active jacks, for example within a conference room, may be easily managed by a network manager without the need to address each active jack within an access-enabled area. Active jacks according to the present invention may be connected to other active jacks provided within a network, and active jacks provided within walls may be connected to other active jacks provided in walls or to active jacks provided in patch panels. Further, in some network architectures according to the present invention, active jacks provided within patch panels may be connected to other network jacks provided in patch panels.

The use of active jacks in a multiple-dwelling unit as shown in FIG. 15 also enhances cable management for a service provider by allowing the identification of communication problems at individual spans of cable. Centralized control and monitoring of active jacks also allows a network manager to determine if unauthorized network access—or network "pirating"—is attempted and further provides the network manager with information necessary to determine the physical location of attempted unauthorized access.

Because active jacks integrated into patch panels or wall jacks can send connection information upstream to a remote network management system, the need to send technicians to remote sites to determine equipment conditions or to service equipment can be reduced or, in many cases, eliminated. As with other multiple-user embodiments described herein, only a few users have been shown, but it is to be understood that the present invention may be used to facilitate implementations with many more users.

Active jacks according to the present invention can be used to extend the physical range of Ethernet systems. By regenerating signals received, active jacks positioned along a communication pathway serve to increase the effective range of signals, resulting in a sturdier communication pathway. Also, since each active jack in some embodiments of the invention regenerates an Ethernet signal it is not necessary to co-locate IP switches and routers with a patch panel. Further, because active jacks can be disposed within patch panels or at wall jacks, communications pathways can be designed to take the greatest advantage of active jack placement while keeping costs low. Active jacks may also be used in combination with wireless network elements, such as wireless access points ("WAPs") to provide the features of active jacks in wireless networks.

Figure 16:
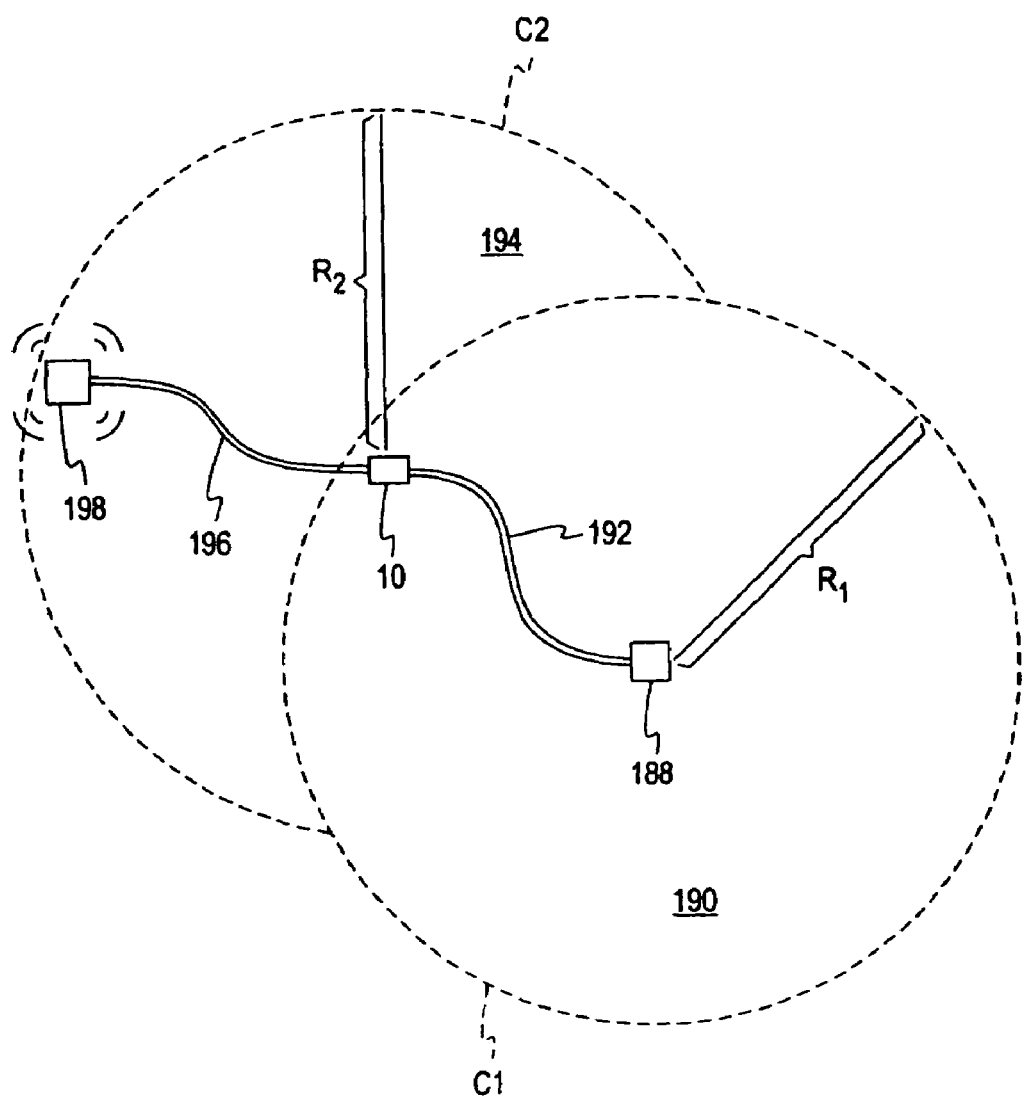
FIG. 16 is a block diagram of a network according to one embodiment of the present invention.

FIG. 16 shows a block diagram of a communications network employing active jacks to extend the network range. In the network of FIG. 16, a network element 188, such as a switch, has a first radius "R1" within which the network element may conduct network signals via wired connections. Thus, the network element 188 has an operable area 190 denoted by a first dotted circle "C1." Providing a wired connection 192 to an active jack 10 positioned near the perimeter of the operable area 190 of the network element 188 will increase the effective area of the system because the active jack 10 can regenerate communication signals. A second circle "C2" having a second radius "R2" shows the extended effective area 194 achieved when the active jack 10 is employed. Further extension can be achieved by employing multiple active jacks 10 or by providing an additional wired connection 196 from the active jack 10 to a wireless access point 198. It is to be understood that active jacks used for the extension of range as shown in FIG. 16 may be provided as wall jacks or as active jacks within patch panels. Further, it is to be understood that wireless access points 198 and active jacks 10 may be deployed in a variety of configurations as desired in particular networking applications, and that active jacks may be provided within areas served by wireless access points to regenerate signals from the wireless access point along an additional cabled line. Additionally, while R1 and R2 have been shown approximately equivalent to each other in FIG. 16, it is to be appreciated some embodiments of the present invention may employ two different radii. Wireless access points and dual-homing active jacks (described above with reference to FIG. 4b) may be employed to switch device access from a primary wireless access point to a secondary wireless access point when networking problems develop with the primary wireless access point.

Turning now to FIG. 17, a cross-sectional view is shown of a patch panel assembly 200 according to one embodiment of the present invention. The patch panel assembly 200 is adapted for use in a powered patch panel for providing power to end-point devices such as, for example, VOIP telephones. According to one embodiment, the patch panel is a 24-port mid-span patch panel capable of supplying power over Ethernet (PoE) under the IEEE 802.3af standard and under a proprietary power-providing technique such as the technique employed by Cisco Systems, Inc. The patch panel includes power source control circuitry for supplying power to end-point devices. According to one embodiment, management connectivity to a local area network (LAN) is accomplished in a daisy chain manner through a Network Interface Card (NIC). Daisy chaining the management ports reduces the waste of Ethernet switch ports that can result when other PoE power supplying equipment requiring a single Ethernet switch port per unit is connected to an Ethernet switch.

According to one embodiment, a patch panel according to the present invention is capable of supplying 48 V DC power over 100 meters of unshielded twisted-pair (UTP) cabling. The following modes of operation are available and set by auto-sensing circuitry:

Provide IEEE 802.3af compliant power in accordance with mid-span powering requirements Provide power according to another protocol, such as the Cisco Systems, Inc. proprietary protocol Pass power on from an end-span device (e.g., a switch) power supplying equipment (PSE) supplying power on pairs (1,2) and (3,6) of an eight-conductor cable.

According to one embodiment, the detection of devices adapted to receive power via the IEEE 802.3af standard is accomplished first by scanning. For devices that are found not to comply with the standard, a second scheme is used to scan for powered devices complying with another protocol, such as the protocol used by Cisco Systems, Inc.

A power-supplying patch panel according to the present invention may support 10/100 Base-T Ethernet transmissions through 24 ports in one 19" EIA standard rack space. The patch panel is adapted to receive power from a local power source and provide power to powered devices using communications cables, without requiring separate power sources for each powered device. As shown in FIGS. 17 and 18, the patch panel assembly 200 contains RJ-45 jacks 202 on a front panel 203, such as a metal face plate. Standard 110 punch-down blocks 204 are provided in a rear panel 205 in the rear of the patch panel assembly 200.

LED indicators 206 are provided for display on the front panel 203 to show powered device (PD) status. Additional LEDs may be provided to show system status. According to one embodiment, two LEDs of different colors are provided for each port, allowing additional information to be conveyed. Two LEDs (not shown) may be provided on the rear panel 205 near NIC ports (not shown) to provide visual indications of system management status. The LEDs 206 may be provided on a front PCB 208, with a light pipe 210 serving as a conduit to allow the light to be visible on the front panel 203.

A main printed circuit board 212 holds electronics mounted to a surface mount side 214 and to a through-hole-and-surface-mount side 216. The main printed circuit board 212 is connected via a front flexible circuit board 218 to the front PCB 208 and via a rear flexible circuit board 220 to a rear PCB 222. The rear printed circuit board is connected to the punch-down blocks 204 and is supported by a mechanical support 224. As shown in FIG. 18, the flexible circuit boards 218 and 220 may be connected to PCBs with tabs 226. The incorporation of flexible circuitry as an interconnect within the panel reduces cost, reduces the size of the unit, and improves performance and flexibility. According to one embodiment, the distance L from the RJ-45 jacks 202 to the punch-down blocks 204 is approximately four inches.

Turning now to FIG. 19, a powered patch panel 228 is shown along a network pathway between an Ethernet switch 230 and a user PoE device 232. A patch cord 234 connects the Ethernet switch 230 to the powered patch panel 228 and horizontal cabling 236 connects the powered patch panel 228 to the user PoE device 232. The horizontal cabling 236 is connected to the powered patch panel 228 via, for example, 110 punch-down connections (not shown) at the rear of the powered patch panel 228. The powered patch panel 228 may include powered patch panel assemblies 200 as shown in FIGS. 17 and 18.

The incorporation of powered patch panels according to the present invention into a rack can increase the density of supply PoE ports within a rack. Powered patch panels 228 according to the present invention may be provided in different configurations. For example, FIGS. 20a and 20b respectively illustrate front and top views of powered patch panels 228a having a straight configuration, with multiple powered patch panels 228a mounted in a rack environment 238. Similarly, FIGS. 21a and 21b respectively illustrate front and top views of powered patch panels 228b having an angled configuration mounted in a rack environment 238. The powered patch panels 228b having the angled configuration allow for improved management of patch cords 234.

A powered patch panel may provide all PoE capabilities without any external software. A software manager may also be provided. Management software may be provided as a stand-alone Element Manager (EM) that will be used in implementations without a Network Management System (NMS). Management capabilities may also be provided through NMS software. In one embodiment, each patch panel requires an IP address in order to utilize management capabilities, with Dynamic Host Control Protocol (DHCP) being the default method of assigning an IP address.

Powered patch panels according to the present invention may incorporate active jacks or they may be provided with non-active communication jacks. In the latter case, powered patch panels are adapted for use as standard patch panels with the additional function of providing power to powered devices.

Powered patch panel EM software has several capabilities. For example, EM software can allow a network administrator to discover all compatible powered patch panels in a network. Physical location information regarding the powered patch panel—such as patch panel room location and rack number—may be entered into the EM software. Individual ports may be selectively turned on or off upon command. Ports may be selectively powered down depending on criticality. For example, ports may be powered down selectively in the event of a power outage requiring emergency backup power. Real-time graphical display of panel power status and fault conditions, and port and PD status, may be provided. Some or all of these features may be incorporated into EM software.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A communications patch panel for connection between endpoint devices and upstream network devices in a network, said communications patch panel comprising:
    a plurality of front-side communications connectors provided in a front panel of said communications patch panel;
    a plurality of back-side communications connectors provided in a rear panel of said communications patch panel, each of said back-side communication connectors being electrically connected to a corresponding one of said plurality of front-side communications connectors;
    power source control circuitry connected intermediate each of the plurality of front-side communications connectors and the plurality of back-side communications connectors, said power source control circuitry being operative to supply power from a power supply to endpoint devices along communications cables; and
    a first management port providing connectivity between the communications patch panel and a network management system of said network.

2. The communications patch panel of claim 1 wherein said plurality of front-side communications connectors comprise RJ-45 jacks.

3. The communications patch panel of claim 1 wherein said plurality of back-side communications connectors comprise punch-down blocks.

4. The communications patch panel of claim 1 further comprising a second management port whereby multiple communications patch panels may be connected to a single Ethernet switch port for management, using a daisy-chain connection.

5. The communications patch panel of claim 1 wherein said power source control circuitry is operative to execute management commands, said management commands including at least one command selected from the group consisting of: allowing a network administrator to discover all compatible powered patch panels, conveying information about the physical location of the communications patch panel, selectively powering communications connectors, and providing real-time information on panel power status and fault conditions.

6. The communications patch panel of claim 1 further comprising a plurality of power indicator lights on the front panel of the communications patch panel, each of said power indicator lights being associated with one of said front-side ports and indicating the status of an endpoint device associated with the corresponding front-side port.

7. The communications patch panel of claim 6 wherein each of said power indicator lights comprises an LED mounted on a circuit board within said communications patch panel and a light pipe connected between said LED and said front panel of said communications patch panel.

8. A communications patch panel for connection between endpoint devices and upstream network devices in a network, said communications patch panel comprising:
    a plurality of front-side RJ-45 communications connectors provided in a front panel of said communications patch panel;
    a plurality of back-side punch-down communications connectors provided in a rear panel of said communications patch panel, each of said back-side communication connectors being electrically connected to a corresponding one of said plurality of front-side communications connectors; and
    power source control circuitry connected intermediate each of the plurality of front-side communications connectors and the plurality of back-side communications connectors, said power source control circuitry being operative to supply power from a power supply to endpoint devices along communications cables.

9. The communications patch panel of claim 8 further comprising first and second management ports for providing connectivity between the communications patch panel and a network management system of said network and further providing for the connection of multiple patch panels to a single Ethernet switch port for management using a daisy-chain connection.

10. The communications patch panel of claim 8 wherein said power source control circuitry is operative to execute management commands, said management commands including at least one command selected from the group consisting of: allowing a network administrator to discover all compatible powered patch panels, conveying information about the physical location of the communications patch panel, selectively powering communications connectors, and providing real-time information on panel power status and fault conditions.

11. The communications patch panel of claim 8 further comprising a plurality of power indicator lights on the front face of the communications patch panel, each of said power indicator lights being associated with one of said front side RJ-45 communications connectors and indicating the status of an endpoint device associated with the corresponding RJ-45 communications connector.

12. The communications patch panel of claim 11 wherein each of said power indicator lights comprises an LED mounted on a circuit board within said communications patch panel and a light pipe connected between said LED and said front panel of said communications patch panel.

13. A communications patch panel for connection between endpoint devices and upstream network devices in a network, said communications patch panel comprising:
   a plurality of front-side RJ-45 communications connectors provided in a front panel of said communications patch panel for connection to an upstream network device in said network;
   a plurality of back-side punch-down communications connectors provided in a rear panel of said communications patch panel for connection to endpoint devices in said network, each of said back-side punch-down communications connectors being electrically connected to a corresponding one of said plurality of front-side RJ-45 communications connectors;
   power source control circuitry connected intermediate each of the plurality of front-side RJ-45 communications connectors and the plurality of back-side punch-down communications connectors, said power source control circuitry being operative to supply power from a power supply to endpoint devices along communications cables;
   a first management port providing connectivity between the communications patch panel and a network management system of said network; and
   a second management port whereby multiple communications patch panels may be connected to a single Ethernet switch port for management, using a daisy-chain connection;
   wherein said power source control circuitry is operative to execute management commands, said management commands including at least one command selected from the group consisting of: allowing a network administrator to discover all compatible powered patch panels, conveying information about the physical location of the communications patch panel, selectively powering communications connectors, and providing real-time information on panel power status and fault conditions.

14. The communications patch panel of claim 13 wherein said plurality of front-side RJ-45 communications connectors are connected to said circuit board via flexible connections.

15. The communications patch panel of claim 13 wherein said plurality of back-side punch-down communications connectors are connected to said circuit board via flexible connections.

\* \* \* \* \*